US008750690B2

(12) United States Patent
Mae et al.

(10) Patent No.: US 8,750,690 B2
(45) Date of Patent: Jun. 10, 2014

(54) APPARATUS, METHOD, AND COMPUTER PROGRAM FOR PROCESSING INFORMATION

(75) Inventors: Atsushi Mae, Kanagawa (JP); Kenichiro Aridome, Kanagawa (JP); Yukio Isobe, Kanagawa (JP); Naoki Morimoto, Tokyo (JP)

(73) Assignee: Sony Corporation (JP)

( * ) Notice: Subject to any disclaimer, the term of this patent is extended or adjusted under 35 U.S.C. 154(b) by 1868 days.

(21) Appl. No.: 11/821,044

(22) Filed: Jun. 20, 2007

(65) Prior Publication Data

US 2008/0131090 A1    Jun. 5, 2008

(30) Foreign Application Priority Data

Jun. 23, 2006  (JP) ................ P2006-173753

(51) Int. Cl.
*H04N 5/84*    (2006.01)
*H04N 5/89*    (2006.01)

(52) U.S. Cl.
USPC .......................................... 386/336; 386/335

(58) Field of Classification Search
USPC .......... 386/1, 45–46, 125–126, 326, 332–336
See application file for complete search history.

(56) References Cited

U.S. PATENT DOCUMENTS

| 6,963,531 | B2 * | 11/2005 | Ko et al. ................ 369/275.3 |
| 7,801,421 | B2 * | 9/2010 | Seo et al. ................ 386/241 |
| 2004/0005139 | A1 * | 1/2004 | Sameshima ............... 386/46 |
| 2004/0019396 | A1 * | 1/2004 | McMahon et al. ........... 700/94 |
| 2005/0083414 | A1 | 4/2005 | Hidaka et al. |
| 2005/0141883 | A1 | 6/2005 | Wu et al. |
| 2006/0007827 | A1 | 1/2006 | Hwang et al. |
| 2006/0062124 | A1 | 3/2006 | Okumura |
| 2006/0147183 | A1 | 7/2006 | Mae et al. |
| 2007/0174675 | A1 * | 7/2007 | Lee et al. ................ 714/6 |
| 2008/0224988 | A1 * | 9/2008 | Whang ................ 345/102 |

FOREIGN PATENT DOCUMENTS

| EP | 1467562 | 10/2004 |
| EP | 1471530 | 10/2004 |
| EP | 1603121 | 12/2005 |
| EP | 1717807 | 11/2006 |
| EP | 1821304 | 8/2007 |
| JP | 08-045131 | 2/1996 |
| JP | 2001-067774 A | 3/2001 |
| JP | 2003-085944 A | 3/2003 |
| JP | 2003-163867 A | 6/2003 |
| JP | 2004-005776 A | 1/2004 |
| JP | 2004-199787 A | 7/2004 |
| JP | 2004-201170 A | 7/2004 |
| JP | 2004-273037 A | 9/2004 |
| JP | 2005-276270 A | 10/2005 |
| JP | 2006-073158 A | 3/2006 |
| JP | 2006-164370 A | 6/2006 |

(Continued)

*Primary Examiner* — Thai Tran
*Assistant Examiner* — Nigar Chowdhury
(74) *Attorney, Agent, or Firm* — Lerner, David, Littenberg, Krumholz & Mentlik, LLP

(57) ABSTRACT

An information processing apparatus includes a controller for controlling data recording to an information recording medium. The controller executes a state determination process of determining whether the information recording medium is ready to record additionally data. Upon determining that the information recording medium is not ready to additionally record the data, the controller performs a notification process of notifying that the information recording medium is not ready to record additionally the data.

21 Claims, 30 Drawing Sheets

(56) References Cited

FOREIGN PATENT DOCUMENTS

| | | |
|---|---|---|
| JP | 2006-164457 A | 6/2006 |
| JP | 2006-190357 A | 7/2006 |
| JP | 2006-294105 A | 10/2006 |
| WO | 2004/057868 A1 | 7/2004 |
| WO | 2006/061984 A1 | 6/2006 |

* cited by examiner

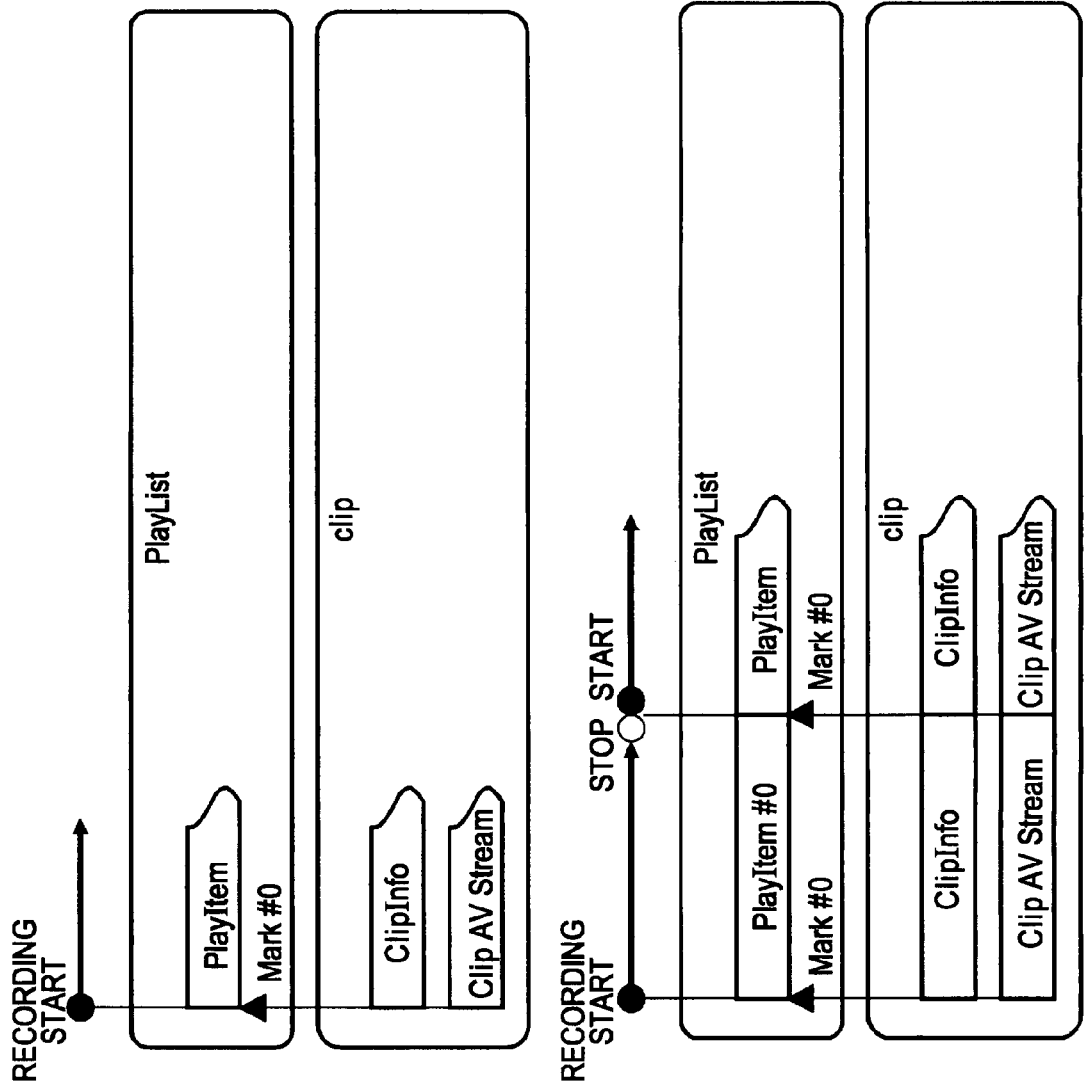

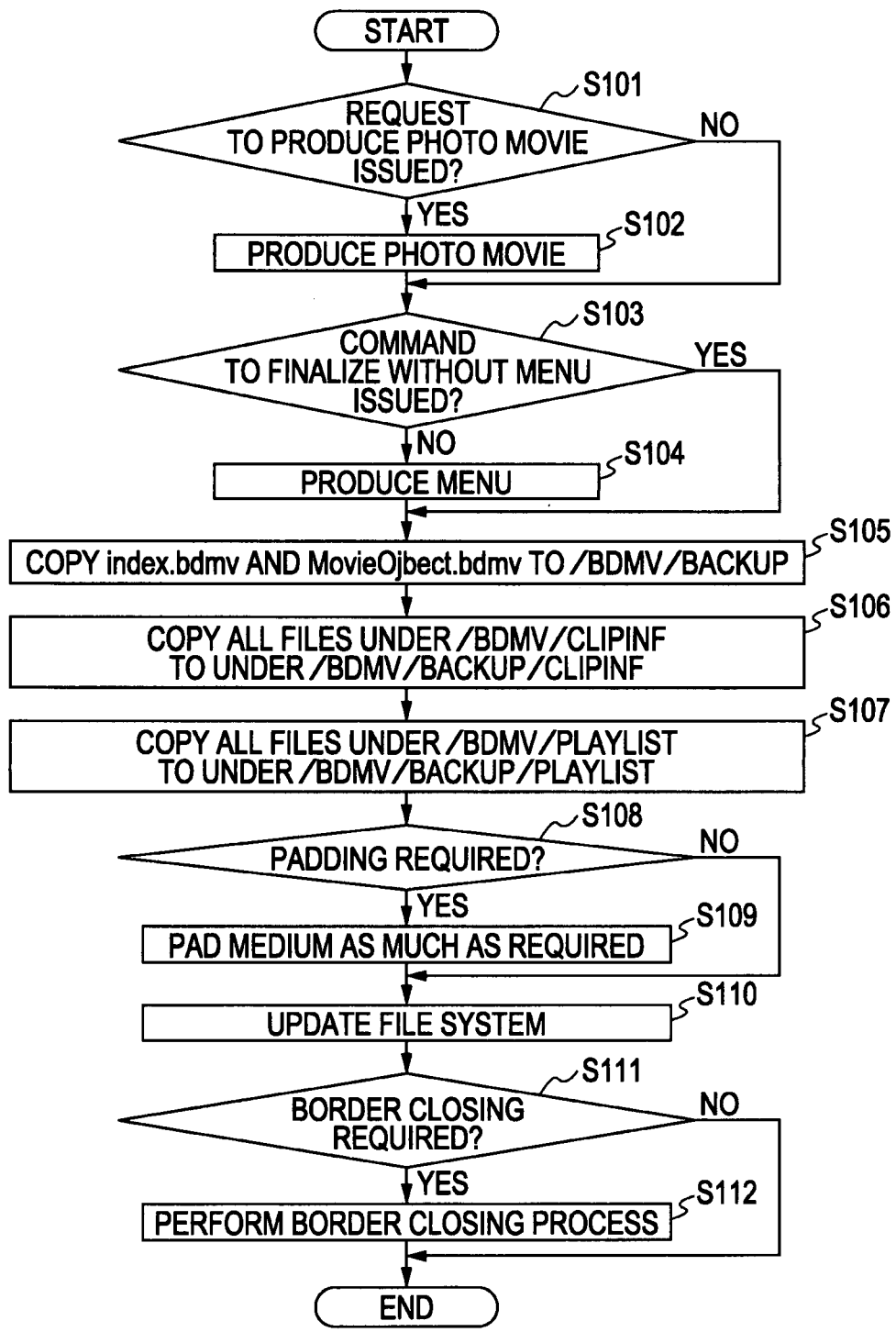

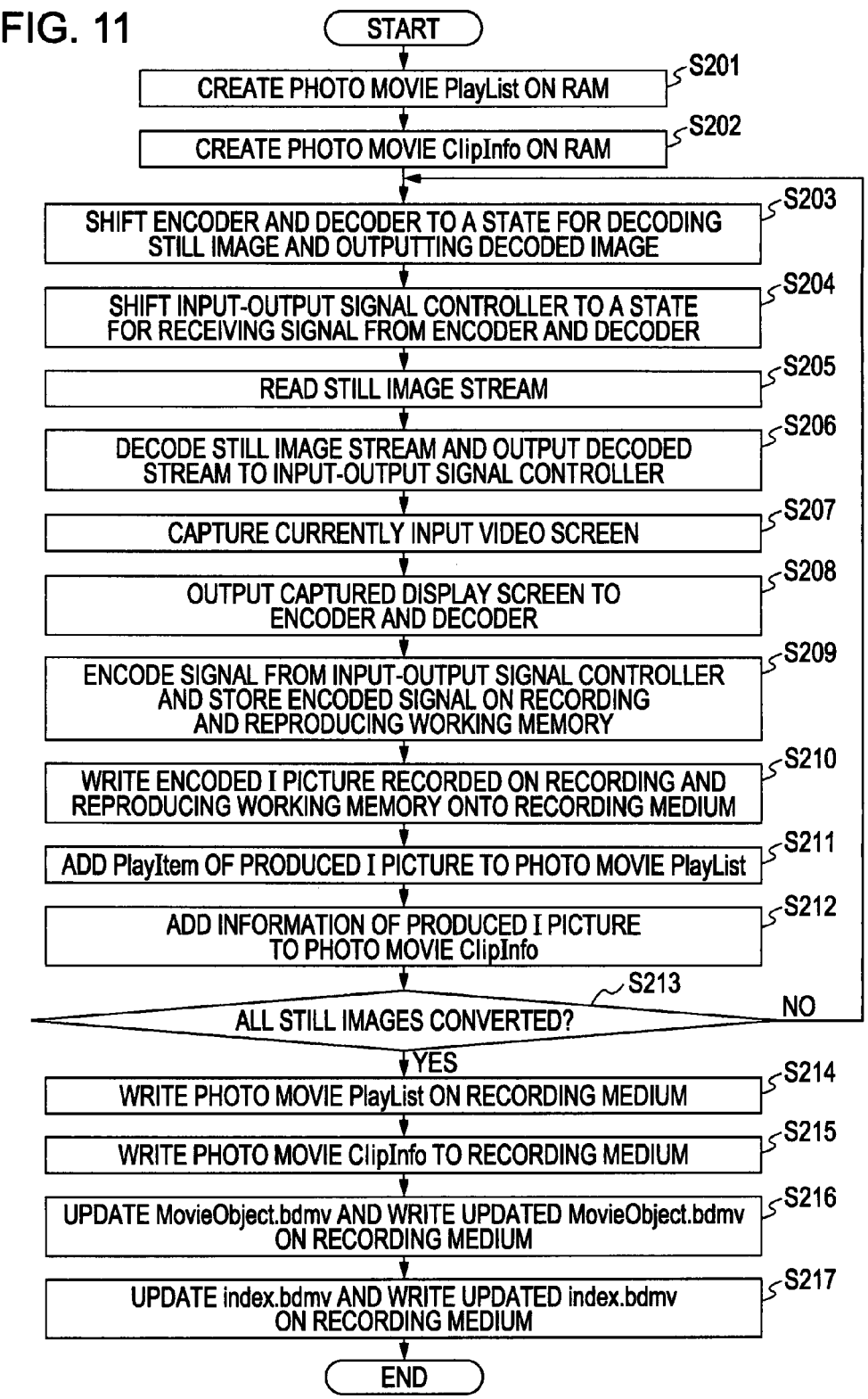

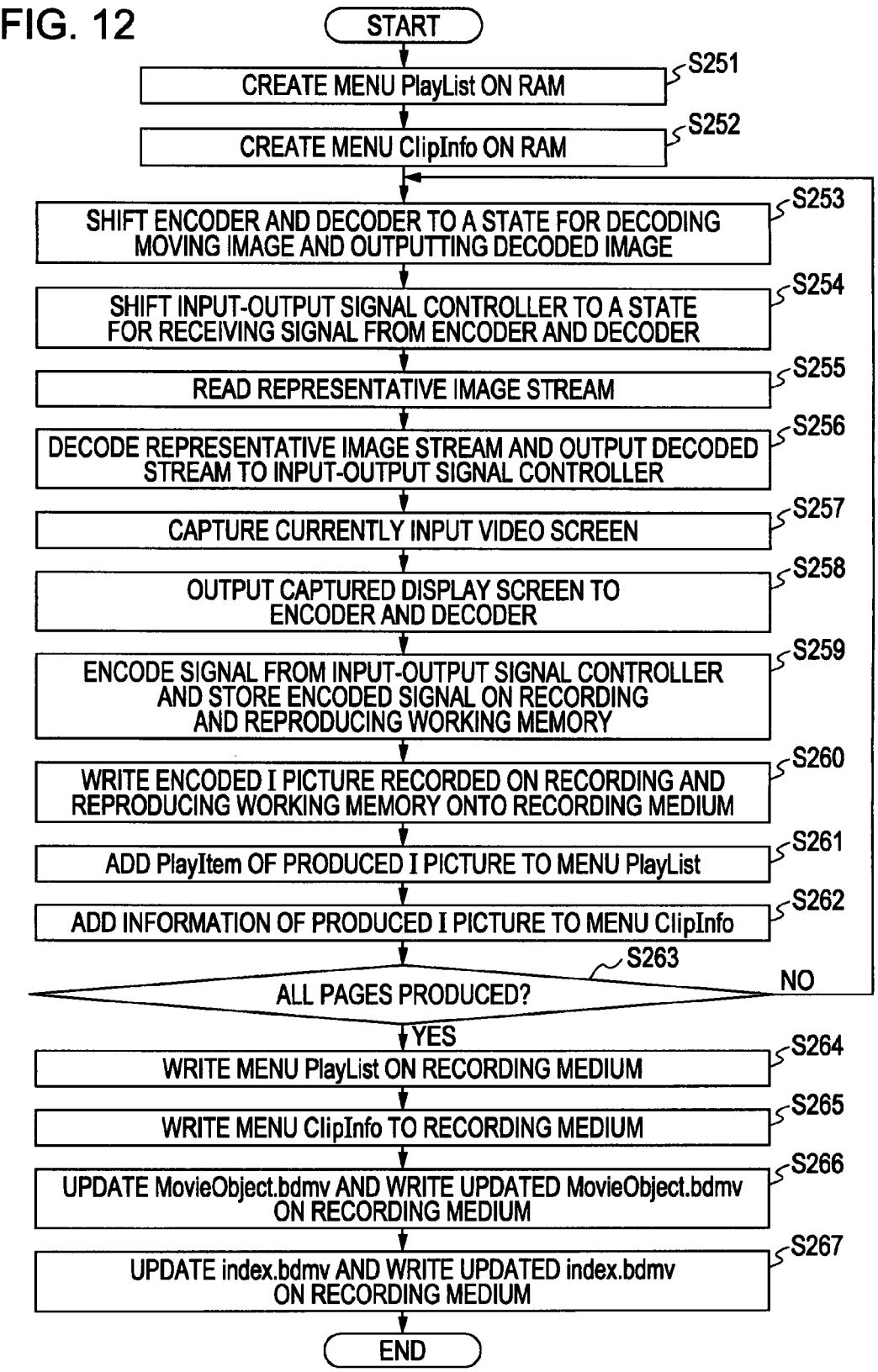

FIG. 14

| Syntax | No. of bits | Mnemonic |
|---|---|---|
| Index. bdmv{ | | |
|   TypeIndicator | 8*4 | bslbf |
|   TypeIndicator2 | 8*4 | bslbf |
|   IndexeStartAddress | 32 | uimsbf |
|   ExtensionDataStartAddress | 32 | uimsbf |
|   reserved | 192 | bslbf |
|   ApplInfoBDMV() | | |
|   for (i=0;i<N1;i++){ | | |
|     padding_word | 16 | bslbf |
|   } | | |
|   Indexes() | | |
|   for (i=0;i<N2;i++){ | | |
|     padding_word | 16 | bslbf |
|   } | | |
|   blkExtensionData() | | |
|   for (i=0;i<N3;i++){ | | |
|     padding_word | 16 | bslbf |
|   } | | |
| } | | |

| Syntax | No. of bits | Mnemonic |
|---|---|---|
| ExtensionData() { | | |
|   length | 32 | uimsbf |
|   if(length !=0) { | | |
|     data_block_start_address | 32 | uimsbf |
|     reserved | 24 | bslbf |
|     number_of_ext_data_entries | 8 | uimsbf |
|     for (i=0;i<number_of_ext_data_entries;i++) { | | |
|       ext_data_entry() { | | |
|         ID1   <XXXX (REPRESENTING AVCHD)> | 16 | uimsbf |
|         ID2   <XXXX (REPRESENTING VERSION)> | 16 | uimsbf |
|         ext_data_start_address | 32 | uimsbf |
|         ext_data_length | 32 | uimsbf |
|       } | | |
|     } | | |
|     for (i=0<;i<L1;i++) { | | |
|       padding_word | 16 | bslbf |
|       padding_word | 16 | bslbf |
|     } | | |
|     data_block | 32 + 8 * (length − data_block_ start_address) | |
|   } | | |
| } | | |

| Syntax | No. of bits | Mnemonic |
|---|---|---|
| indexExtensionData() { | | |
|   type_indicator | 8*4 | uimsbf |
|   reserved | 8*4 | bslbf |
|   TableOfPlayLists_start_address | 32 | uimsbf |
|   MakersPrivateData_start_address | 32 | uimsbf |
|   reserved_for_future_use | 192 | bslbf |
|   UIAppinfoAVCHD() | | |
|   for (i=0;i<N1;i++) { | | |
|     padding_word | 16 | bslbf |
|   } | | |
|   TableOfPlayLists() | | |
|   for (i=0;i<N2;i++) { | | |
|     padding_word | 16 | bslbf |
|   } | | |
|   MakersPrivateData() | | |
|   for (i=0;i<N3;i++) { | | |
|     padding_word | 16 | bslbf |
|   } | | |
| } | | |

| Syntax | No. of bits | Mnemonic |
|---|---|---|
| TableOfPlayLists() { | | |
|   length | 32 | uimsbf |
|   FirstPlayback_PlayLists() | | |
|   TopMenu_PlayLists() | | |
|   number_of_Title_PlayList_pair | 16 | bslbf |
|   for (i=0;i<number_of_Title_PlayList_pair++) { | | |
|     Title_PlayList_pair | | |
|     PlayList_file_name | 8*5 | bslbf |
|     reserved_for_future_use | 6 | bslbf |
|     PlayList_attribute | 2 | uimsbf |
|     reserved_for_future_use | 14 | bslbf |
|     resf_to_title_id | 16 | uimsbf |
|   } | | |
| } | | |

FIG. 18

| Syntax | No. of bits | Mnemonic |
|---|---|---|
| FirstPlayback_PlayLists/TopMenu_PlayLists() { | | |
|   Length | 32 | uimsbf |
|   number_of_PLayLists                                                                                  <1 or 0> | 16 | uimsbf |
|   for (i=0;i<number_of_PlayLists++) { | | |
|     PlayList_file_name | 8 * 5 | bslbf |
|     reserved_for_future_use | 8 | bslbf |
|   } | | |
| } | | |

| Syntax | No. of bits | Mnemonic |
|---|---|---|
| Movie_PlayList_File{ | | |
|   TypeIndicator | 8*4 | bslbf |
|   TypeIndicator2 | 8*4 | bslbf |
|   PlayListStartAddress | 32 | uimsbf |
|   PlaylistMarkStartAddress | 32 | uimsbf |
|   ExtensionDataStartAddress | 32 | uimsbf |
|   reserved | 160 | bslbf |
|   blkApplicationPlayList() | | |
|   for (i=0;i<N1;i++){ | | |
|     padding_word | 16 | bslbf |
|   } | | |
|   blkPlayList() | | |
|   for (i=0;i<N2;i++){ | | |
|     padding_word | 16 | bslbf |
|   } | | |
|   blkPlayListMark() | | |
|   for (i=0;i<N3;i++){ | | |
|     padding_word | 16 | bslbf |
|   } | | |
|   blkExtensionData() | | |
|   for (i=0;i<N4;i++){ | | |
|     padding_word | 16 | bslbf |
|   } | | |
| } | | |

| Syntax | No. of bits | Mnemonic |
|---|---|---|
| ExtensionData() { | | |
|   type_indicator | 8*4 | uimsbf |
|   reserved | 8*4 | bslbf |
|   PlayListMarkExt_start_address | 32 | uimsbf |
|   MakersPrivateData_start_address | 32 | uimsbf |
|   reserved_for_future_use | 192 | bslbf |
|   PlayListMeta() | | |
|   for (i=0;i<N1;i++) { | | |
|     padding_word | 16 | bslbf |
|   } | | |
|   PlayListMarkExt() | | |
|   for (i=0;i<N2;i++) { | | |
|     padding_word | 16 | bslbf |
|   } | | |
|   MakersPrivateData() | | |
|   for (i=0;i<N3;i++) { | | |
|     padding_word | 16 | bslbf |
|   } | | |
| } | | |

| Syntax | No. of bits | Mnemonic |
|---|---|---|
| MakersPrivateData() { | | |
|   length | 32 | uimsbf |
|   if(length != 0) { | | |
|     data_block_start_address | 32 | uimsbf |
|     reserved_for_word_align | 24 | bslbf |
|     number_of_maker_entries | 8 | uimsbf |
|     for (i=0;i<number_of_maker_entries;i++) { | | |
|       maker_ID | 16 | uimsbf |
|       maker_model_code | 16 | uimsbf |
|       mpd_start_address | 32 | uimsbf |
|       mpd_length | 32 | uimsbf |
|     } | | |
|     for (i=0<;i<L1;i++){ | | |
|       padding_word | 16 | bslbf |
|       padding_word | 16 | bslbf |
|     } | | |
|     data_block | 32+ 8*(length− data_block_ start_address) | |
|   } | | |
| } | | |

371

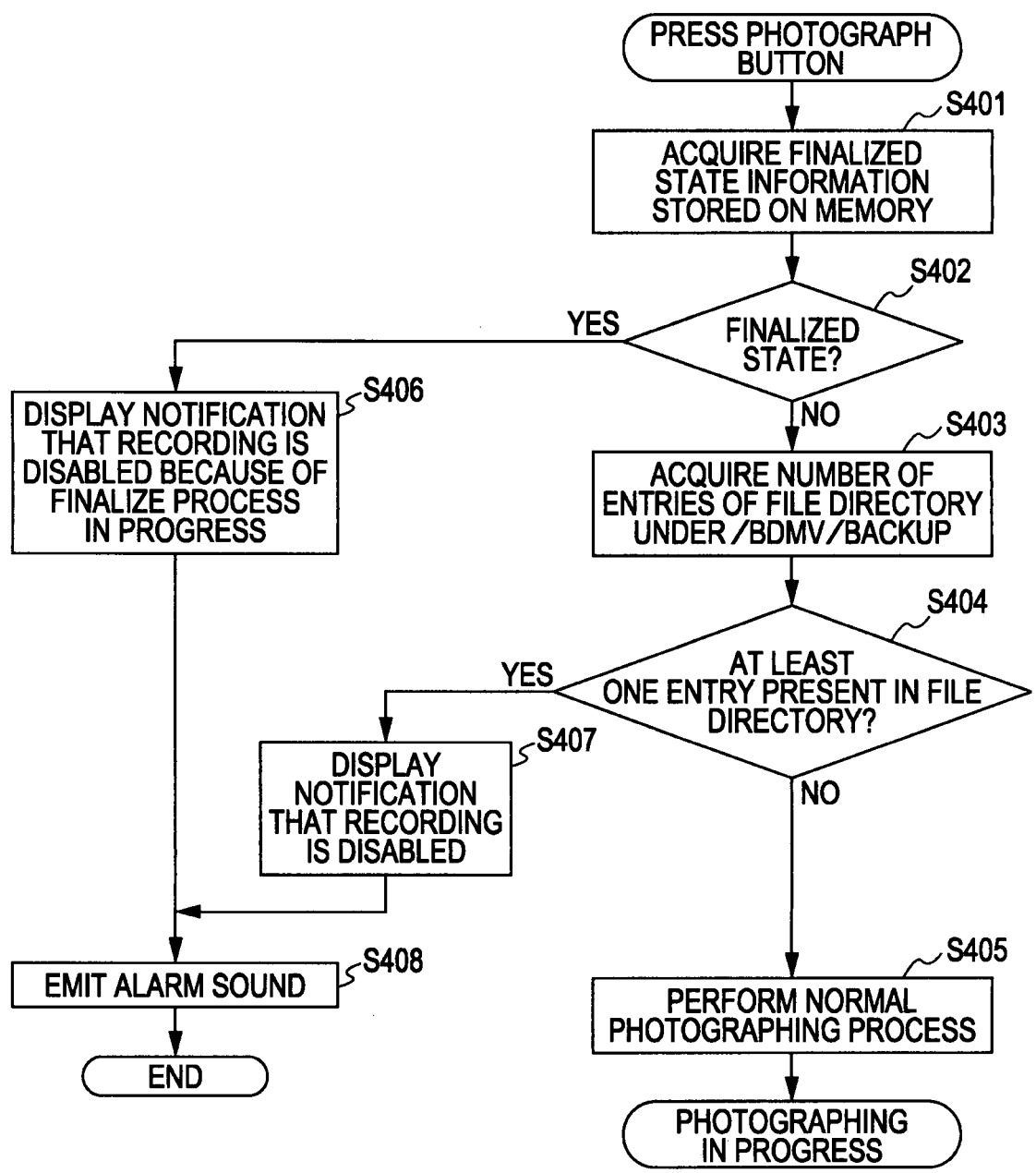

FIG. 26

| Syntax | No. of bits | Mnemonic |
|---|---|---|
| Movie PlayList File{ | | |
|   TypeIndicator | 8*4 | bslbf |
|   TypeIndicator2 | 8*4 | bslbf |
|   PlayListStartAddress | 32 | uimsbf |
|   PlaylistMarkStartAddress | 32 | uimsbf |
|   ExtensionDataStartAddress | 32 | uimsbf |
|   reserved | 160 | bslbf |
|   blkApplicationPlayList() | | |
|   for (i=0;i<N1;i++){ | | |
|     padding_word | 16 | bslbf |
|   } | | |
|   blkPlayList() | | |
|   for (i=0;i<N2;i++){ | | |
|     padding_word | 16 | bslbf |
|   } | | |
|   blkPlayListMark() | | |
|   for (i=0;i<N3;i++){ | | |
|     padding_word | 16 | bslbf |
|   } | | |
|   blkExtensionData() | | |
|   for (i=0;i<N4;i++){ | | |
|     padding_word | 16 | bslbf |
|   } | | |
| } | | |

| Syntax | No. of bits | Mnemonic |
|---|---|---|
| blkPlayList() { | | |
|   Length | 32 | uimsbf |
|   reserved | 16 | bslbf |
|   NumberOfPlayItems | 16 | uimsbf |
|   NumberOfSubPaths | 16 | uimsbf |
|   for(PlayItem_id=0; PlayItem_id<NumberOfPlayItems_id++) { | | |
|     blkPlayItem() | | |
|   } | | |
|   for(SubPath_id=0; SubPath_id<NumberOfSubPaths_id++) { | | |
|     blkSubPath() | | |
|   } | | |
| } | | |

| Syntax | No. of bits | Mnemonic |
|---|---|---|
| blkPlayItem() { | | |
|     Length | 16 | uimsbf |
|     ClipInformationFileName | 8*5 | bslbf |
|     ClipCodecIdentifier | 8*4 | bslbf |
|     reserved | 12 | bslbf |
|     ConnectionCondition | 4 | bslbf |
|     RefToSTCID | 8 | uimsbf |
|     INTime | 32 | uimsbf |
|     OUTTime | 32 | uimsbf |
|     blkUOMaskTable() | | |
|     PlayItemRandomAccessFlag | 1 | bslbf |
|     reserved | 7 | bslbf |
|     StillMode | 8 | bslbf |
|     if(StillMode==0x01){ | | |
|         StillTime | 16 | uimsbf |
|     }else{ | | |
|         reserved | 16 | bslbf |
|     } | | |
|     blkSTNTable() | | |
| } | | |

| Syntax | No. of bits | Mnemonic |
|---|---|---|
| SubPath() { | | |
|     Length | 32 | uimsbf |
|     reserved | 8 | bslbf |
|     Subpath_type | 8 | bslbf |
|     reserved | 15 | bslbf |
|     reserved | 1 | bslbf |
|     reserved | 8 | bslbf |
|     NumberOfPlayItems | 8 | uimsbf |
|     for (i=0;i<number of SubPlayItems;i++){ | | |
|         SubPlayItem(i) | | |
|     } | | |
| } | | |

431 — NumberOfPlayItems
432 — SubPlayItem(i)

FIG. 30

| Syntax | No. of bits | Mnemonic |
|---|---|---|
| blkSubPlayItem() { | | |
|     Length | 16 | uimsbf |
|     ClipInformationFileName | 8*5 | bslbf |
|     ClipCodecIdentifier | 8*4 | bslbf |
|     reserved | 27 | bslbf |
|     '0001' | 4 | bslbf |
|     reserved | 1 | bslbf |
|     RefToSTCID | 8 | uimsbf |
|     SubPlayItem_INTime | 32 | uimsbf |
|     SubPlayItem_OUTTime | 32 | uimsbf |
|     reserved | 16 | uimsbf |
|     reserved | 32 | uimsbf |
| } | | |

441

APPARATUS, METHOD, AND COMPUTER PROGRAM FOR PROCESSING INFORMATION

CROSS-REFERENCE TO RELATED APPLICATIONS

The present application claims priority from Japanese Patent Application No. JP 2006-173753, filed in the Japanese Patent Office on Jun. 23, 2006, the entire content of which is incorporated herein by reference.

BACKGROUND OF THE INVENTION

1. Field of the Invention

The present invention relates to an information processing apparatus, an information processing method and a computer program. More specifically, the present invention relates to an information processing apparatus, an information processing method and a computer program for performing a responsive process such as providing an alarm or canceling a finalizing process by determining whether the finalize process as a transition process of an information recording medium to a data additional storage disabled state has been performed.

2. Description of the Related Art

As the recording capacity of disk-type recording media increases, video cameras storing moving images or still images on a disk instead of the known recording tape are commercially available. Since the disk-type recording medium is used in a random-access fashion, any desired scene can be efficiently found from recorded data. Since the disk-type recording medium operates in a non-contact fashion, data accessing to the disk is performed in a manner free from physical wear. For example, digital versatile disk (DVD) video cameras are in widespread use because of the user friendliness thereof such as high image quality and ease of editing.

One of information recording processes includes producing a menu for content recorded on an information recording medium. For example, a menu is generated in a finalize process for setting the information recording medium to be in an additional storage disabled state.

One apparatus may additionally store or edit content on a removable medium on which another apparatus has already recorded content. In this case, the additional storage or edit of the content on the medium by own apparatus causes a discrepancy between a structure of a menu and the already recorded content.

For example, if a reproducing apparatus displays a produced menu, the additionally stored content cannot be reproduced. To avoid such an inconvenience, the apparatus must delete the menu produced on the other apparatus or leave the medium with the discrepancy unresolved. Once the menu produced on the other apparatus is automatically deleted on own apparatus without consulting with the user of the other apparatus, it becomes difficult to verify the menu later. This inconveniences the user who has used the other apparatus on which the menu has been produced. The discrepancy between the menu and recorded content not only violates data recording format but also makes it difficult for players to reproduce the recorded content, thereby leading to a cause of trouble.

SUMMARY OF THE INVENTION

It is desirable to provide an information processing apparatus, an information processing method, and a computer program for recording data in a discrepancy-free manner by executing a responsive process such as providing an alarm or canceling a finalize process by determining whether the finalize process to set an information recording medium to an additional storage disabled state has been performed, and by deleting a menu in the finalize canceling process if a produced menus is available.

In accordance with one embodiment of the present invention, an information processing apparatus includes a controller for controlling data recording on an information recording medium. The controller executes a state determination process of determining whether the information recording medium is ready to record additionally data, and upon determining that the information recording medium is not ready to additionally record the data, performs a notification process of notifying that the information recording medium is not ready to record additionally the data.

The controller in the state determination process may examine data stored on the information recording medium and determine that the information recording medium is not ready to store additionally the data if information indicating that play list information corresponding to a menu is recorded on the information recording medium is detected.

The controller in the state determination process may examine data stored on the information recording medium and determine that the information recording medium is not ready to store additionally the data if information indicating that play list information corresponding to moving image format data generated based on a still image is recorded on the information recording medium is detected.

The controller in the state determination process may examine data stored on the information recording medium and determine that the information recording medium is not ready to store additionally the data if identification information indicating that a transition process of the information recording medium to a data additional storage disabled state has been performed is detected.

The controller may perform a transition process on the information recording medium from the data additional storage disabled state to a data additional storage enabled state in response to an input of a transition request requesting transition to the data additional storage enabled state.

The controller in the transition process of the information recording medium to the data additional storage enabled state may examine the data stored on the information recording medium and delete play list information corresponding to a menu.

The controller in the transition process of the information recording medium to the data additional storage enabled state may examine the data stored on the information recording medium and delete play list information corresponding to moving image format data generated based on a still image.

The controller in the transition process of the information recording medium to the data additional storage enabled state may examine the data stored on the information recording medium and delete identification information indicating that the transition process of the information recording medium to the data additional storage disabled state has been performed or record information indicating that the information recording medium is ready to store additionally the data.

The controller in the state determination process may examine the number of entries set in a backup data storage directory in data stored on the information recording medium and determine that the information recording medium is not ready to store additionally the data if at least one set entry is detected.

The controller in the state determination process may set the information recording medium to a data additional storage enabled state by deleting the entry set in the backup data storage directory if at least one entry set in the backup data storage directory is detected in the data stored on the information recording medium.

In accordance with one embodiment of the present invention, an information processing method of an information processing apparatus for recording data on an information recording medium, includes steps of executing a state determination process of determining whether the information recording medium is ready to record additionally data, and upon determining that the information recording medium is not ready to additionally record the data, performing a notification process of notifying that the information recording medium is not ready to record additionally the data.

The information processing method may further include examining data stored on the information recording medium and determining that the information recording medium is not ready to store additionally the data if information indicating that play list information corresponding to a menu is recorded on the information recording medium is detected.

The information processing method may further include examining data stored on the information recording medium and determining that the information recording medium is not ready to store additionally the data if information indicating that play list information corresponding to moving image format data generated based on a still image is recorded on the information recording medium is detected.

The information processing method may further include examining data stored on the information recording medium and determining that the information recording medium is not ready to store additionally the data if identification information indicating that a transition process of the information recording medium to a data additional storage disabled state has been performed is detected.

The information processing method may further include performing a transition process on the information recording medium from the data additional storage disabled state to a data additional storage enabled state in response to an input of a transition request requesting transition to the data additional storage enabled state.

The information processing method may further include examining the data stored on the information recording medium and deleting play list information corresponding to a menu.

The information processing method may further include examining the data stored on the information recording medium and deleting play list information corresponding to moving image format data generated based on a still image.

The information processing method may further include examining the data stored on the information recording medium and deleting identification information indicating that the transition process of the information recording medium to the data additional storage disabled state has been performed or recording information indicating that the information recording medium is ready to store additionally the data.

The information processing method may further include examining the number of entries set in a backup data storage directory in data stored on the information recording medium and determining that the information recording medium is not ready to store additionally the data if at least one set entry is detected.

The information processing method may further include setting the information recording medium to a data additional storage enabled state by deleting the entry set in the backup data storage directory if at least one entry set in the backup data storage directory is detected in the data stored on the information recording medium.

In accordance with one embodiment of the present invention, a computer program for causing a computer to record data one an information recording medium, include steps of executing a state determination process of determining whether the information recording medium is ready to record additionally data, and upon determining that the information recording medium is not ready to additionally record the data, performing a notification process of notifying that the information recording medium is not ready to record additionally the data.

The computer program of one embodiment of the present invention may be supplied, to a computer system performing a variety of program code, in a computer readable format in a recording medium such as a compact disk (CD), a floppy disk (FD), and a magneto-optical (MO) disk, or via a communication medium such as a network. With the program provided in the computer readable format, the computer system performs a process responsive to the computer program.

These and other features and advantages of the present invention will be apparent from the following description, and the accompanying drawings. The word "system" in the context of this specification refers to a logical set of a plurality of apparatuses and is not limited to a single casing containing a plurality of apparatuses.

In accordance with embodiments of the present invention, an information processing apparatus such as a video camera performs the state determination process to determine whether the information recording medium is ready to store additionally the data, namely, whether the information recording medium is in a finalized state. Upon determining based on the state determination process that the information recording medium is not ready to store additionally the data, the information processing apparatus performs the notification process to notify that the information recording medium is not ready to store additionally the data. The user can thus recognize whether the data can be additionally stored. In the state determination process, the information processing apparatus examines the data stored on the information recording medium, and thus determines whether the information recording medium stores the play list information corresponding to the menu or the photo movie or the identification information indicating that the transition process to the data additional storage disabled state has been performed. The information processing apparatus can thus reliably performs the state determination process.

BRIEF DESCRIPTION OF THE DRAWINGS

FIGS. 7A and 7B illustrate a procedure in accordance with which the play list is generated together with the clip of an audio-visual (AV) stream in step with photographing and recording operations of a video camera in accordance with one embodiment of the present invention;

FIG. 9 is a flowchart illustrating a sequence of a finalize process in accordance with one embodiment of the present invention;

FIG. 11 is a flowchart illustrating a sequence of a photo movie production process in accordance with one embodiment of the present invention;

FIG. 12 is a flowchart illustrating a sequence of a menu production process in accordance with one embodiment of the present invention;

FIG. 14 illustrates a syntax of an index file in accordance with one embodiment of the present invention;

FIG. 15 illustrates a syntax of an extension information block of the index file in accordance with one embodiment of the present invention;

FIG. 16 illustrates a data structure of the extension information block of the index file in accordance with one embodiment of the present invention;

FIG. 17 illustrates a data structure of the extension information block of the index file in accordance with one embodiment of the present invention;

FIG. 18 illustrates a data structure of the extension information block of the index file in accordance with one embodiment of the present invention;

FIG. 19 illustrates a syntax of the structure of the play list file in accordance with one embodiment of the present invention;

FIG. 20 illustrates extension data in the play list in accordance with one embodiment of the present invention;

FIG. 21 illustrates maker private data in the play list in accordance with one embodiment of the present invention;

FIG. 23 is a flowchart illustrating a process sequence based on finalized state information at data recording start time of an information processing apparatus in accordance with one embodiment of the present invention;

FIG. 26 illustrates a syntax of the structure of the play list file in accordance with one embodiment of the present invention;

FIG. 27 illustrates a syntax of a play list block in the play list file in accordance with one embodiment of the present invention;

FIG. 28 illustrates a syntax of the structure of play item information in the play list block in the play list file in accordance with one embodiment of the present invention;

FIG. 29 illustrates a syntax of sub path information in the play list file in accordance with one embodiment of the present invention; and FIG. 30 illustrates a syntax of a sub play item contained in the sub path information in the play list file in accordance with one embodiment of the present invention.

DESCRIPTION OF THE PREFERRED EMBODIMENTS

An information processing apparatus 100, an information processing method and a computer program in accordance with embodiments of the present invention are described below with reference to the drawings.

Figure 1:
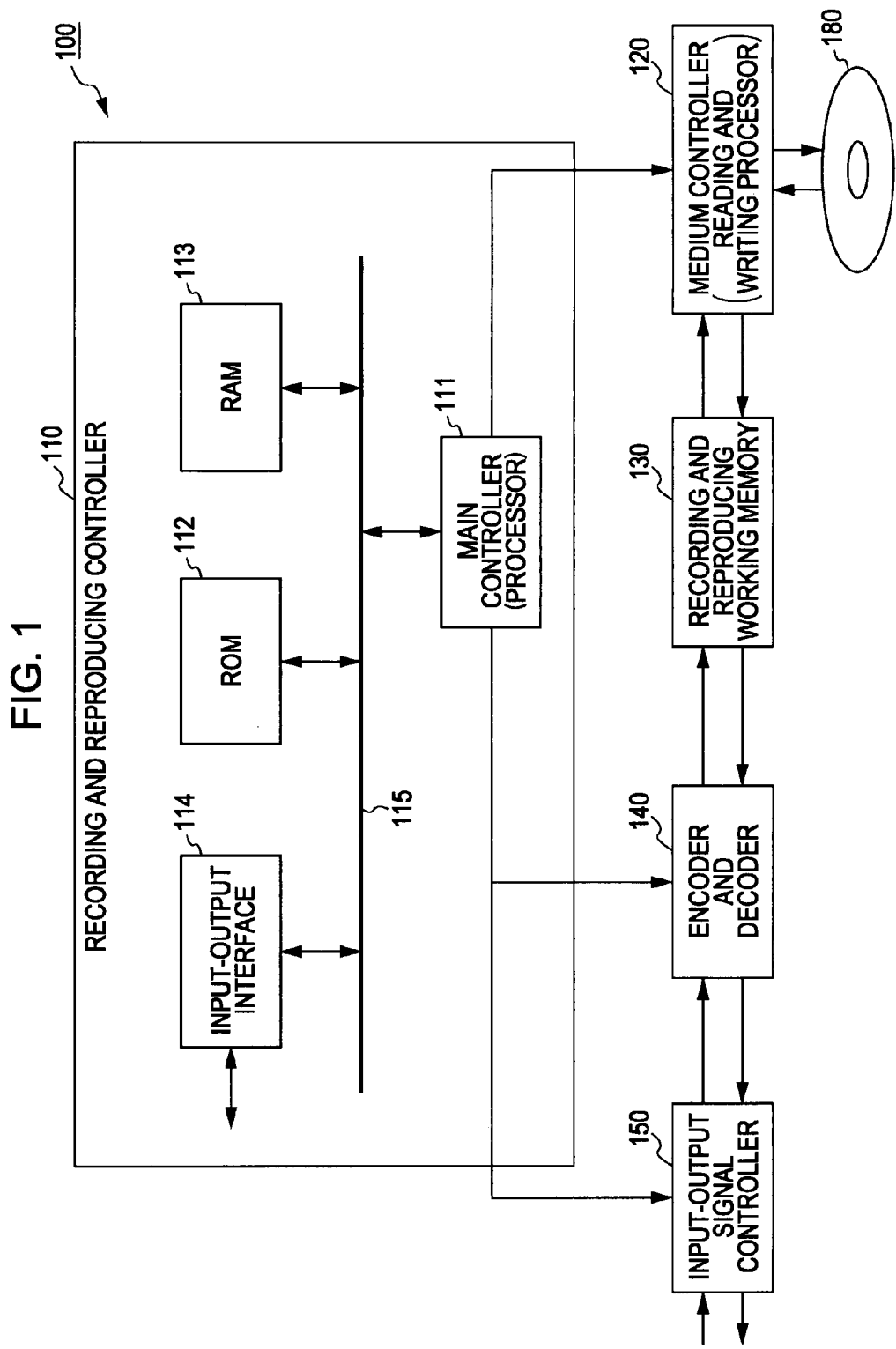
FIG. 1 is a block diagram illustrating an information processing apparatus in accordance with one embodiment of the present invention.

FIG. 1 is a block diagram illustrating the information processing apparatus 100 in accordance with one embodiment of the present invention. The information processing apparatus 100 of FIG. 1 is a video camera. As shown, the information processing apparatus 100 includes a recording and reproducing controller 110, a medium controller (reading and writing processor) 120, a recording and reproducing working memory 130, an encoder and decoder 140 and an input-output signal controller 150. The recording and reproducing controller 110 includes a main controller (processor) 111, a read-only memory (ROM) 112, a random-access memory (RAM) 113, and an input-output interface 114.

The information processing apparatus 100 is designed to record and reproduce a moving image and a still image using an information recording medium 180. The information processing apparatus 100 can generate a file in a moving image format (such as MPEG-4 part 10 Advanced Video Coding (AVC)/H. 264), namely, a photo movie based on the still image recorded on the information recording medium 180, and then re-record the photo movie onto the information recording medium 180. The data recording on the information recording medium 180 may be performed in accordance with the AVCHD format. The data recording in accordance with the AVCHD format will be described in detail later.

When data is recorded, the encoder and decoder 140 encodes the moving image or the still image input from the input-output signal controller 150. For example, the encoder and decoder 140 performs the encoding process on a video stream and an audio stream, composed of an input moving image signal, into a multiplexed data stream. The data encoded by the encoder and decoder 140 is stored on the recording and reproducing working memory 130 and then recorded onto the information recording medium 180 under the control of the medium controller 120.

The encoding operation performed by the encoder and decoder 140 during the data recording process becomes different between the moving image and the still image. The information recording medium 180 thus records thereon a moving image file and a still image file.

The information processing apparatus 100 reads still image data from the information recording medium 180, produces a file in a moving image format (such as MPEG-4 Part 10 Advanced Video Coding (AVC)/H. 264) based on the read still image data, namely, the photo movie, and then re-records the photo movie onto the information recording medium 180.

The photo movie production process, summarized here, will be described in detail later. The medium controller 120 reads the still image data from the information recording medium 180, and stores the read still image data on the recording and reproducing working memory 130. The encoder and decoder 140 decodes the still image signal. The decoded data is then re-input to the encoder and decoder 140 via the input-output signal controller 150. The encoder and decoder 140 generates the (MPEG) encoded data in the moving image format, namely, the photo movie in response to the input data. The generated photo movie is stored on the recording and reproducing working memory 130 and then re-recorded on the information recording medium 180 under the control of the medium controller 120.

The recording and reproducing controller 110 controls a data recording process, a data reproducing process, and a photo movie production process performed by the information processing apparatus 100. The recording and reproducing controller 110 includes a main controller 111, a read-only memory (ROM) 112, a random-access memory (RAM) 113, an input-output interface 114 and a bus 115 used to interconnect these elements.

The main controller 111 issues to the encoder and decoder 140 a start command and a stop command to start and stop the encoding process, respectively. The main controller 111 also issues to the medium controller 120 a data read command and a data write command to read data from and write data to the medium controller 120, respectively. The main controller 111 controls a capturing operation of capturing an input signal from the encoder and decoder 140 and an output operation to output a captured input signal to the encoder and decoder 140. These operations are performed in a production process of the photo movie based on the still image data. More specifically, during the production process of the photo movie, the encoder and decoder 140 decodes the still image data recorded on the information recording medium 180, outputs the decoding process result to the input-output signal controller 150 and then inputs again the still image data from the input-output signal controller 150 to the encoder and decoder 140. The still image data is encoded into the data in the MPEG4-AVC moving image format, namely, the photo movie.

The ROM 112 in the recording and reproducing controller 110 stores a program executed by the main controller 111 and a variety of parameters. The ROM 112 may include an electronically erasable and programmable read-only memory (EEPROM) such as a flash memory. The RAM 113 stores work data required for the main controller 111 to execute the program, and may include one of a static random-access memory (SRAM) and a dynamic random-access memory (DRAM). The input-output interface 114 is connected to a user input unit, a display, or a network and exchanges data and commands with an external device. The input-output interface 114 is used to update the program stored on the ROM 112, for example.

Figure 2:
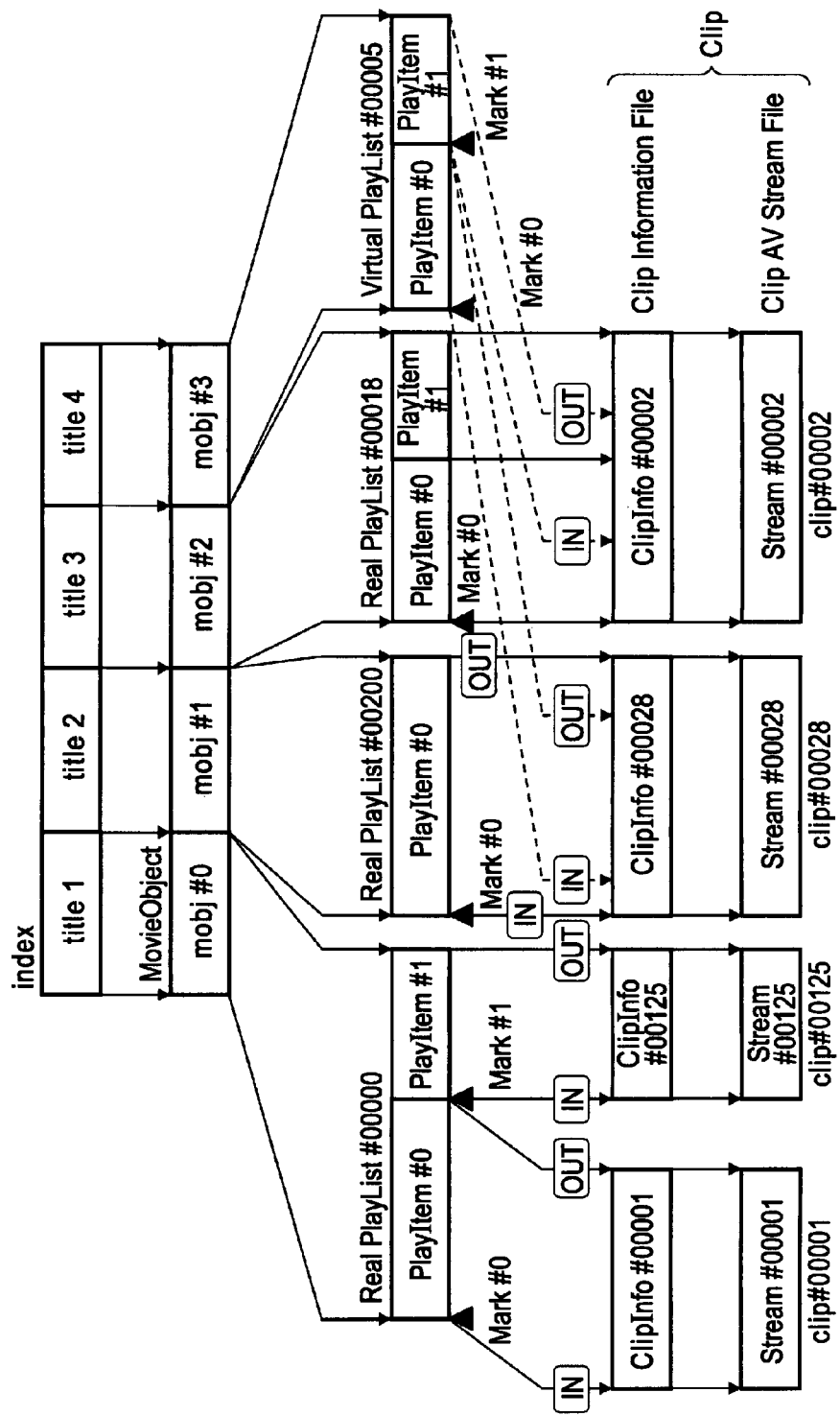
FIG. 2 illustrates a data structure of data recorded on an information recording medium in accordance with one embodiment of the present invention.

FIG. 2 illustrates a data structure of data stored on the information recording medium 180. The data structure to be discussed herein complies with the AVCHD format. As shown in FIG. 2, a moving image stream photographed by the video camera is encoded into an MPEG2-TS stream for recording. Generated and recorded in this case include an index file, a movie object (MovieObject) file, a play list (PlayList) file, a clip information (ClipInformation) file, and a clip AV stream (ClipAVStream) file. Clip information files corresponding to the ClipAVStream of a predetermined data unit are collectively referred to as a clip.

The files are listed below and described in detail.

Index file: Maximum number of index files is one. Function of the index file is as follows: The index file is a root file used to manage the entire medium. The index file manages correspondence between a title shown to a user and a Movieobject file. In accordance with the AVCHD format, the play order of the play lists to be managed by the MovieObject is managed in metadata of the index file.

MovieObject file: Maximum number of MovieObject files is one. Function of the MovieObject file is as follows: the MovieObject file is used to manage the play list that is reproduced when a title is specified in accordance with the BD-ROM format. In accordance with the AVCHD format, the metadata in the index file is used to manage a relationship between the play list and the title without referencing the MovieObject file.

Real PlayList file: Maximum number of total of Real Playlist files and Virtual PlayList files are 2000. The function of the Real PlayList file is as follows: The Real PlayList is the PlayList for the original title. Video recorded and reproduced is registered in the real PlayList file in the order of recording.

Virtual PlayList file: The Virtual Playlist file is a PlayList for producing a user-defined play list through non-destructive editing. The Virtual PlayList has no clip thereof and reproduces data by specifying a clip registered in the Real PlayList file.

Clip Information: Maximum number of Clip Information files is 4000. The Clip Information file is present in pair with the ClipAVStream file, and contains information relating to a stream required for reproducing an actual stream.

Clip AV Stream file: Maximum number of Clip AV Stream files is 4000. The Clip AV Stream file contains a stream recorded in accordance with MPEG2-TS. Video data of AVC is contained in this file.

The index file manages the entire information recording medium 180 by file type layer. An index file is produced for each title shown to a user, and manages a correspondence relationship with the movie object. In accordance with the AVCHD format, the play order of the play lists to be originally managed by a movie object file is managed within the metadata of the index file. When the information recording medium is loaded on a player, the index file is first read. The user can see the title described in the index file.

The MovieObject file is used to manage the play list to be reproduced. A reference to a MovieObject file is listed in the index file as an opening to the title. In accordance with the AVCHD format, the MovieObject file is not referenced and the relationship between the play list and the title is managed by the metadata in the index file.

The PlayList file is arranged in association with the title shown to the user and includes at least one PlayItem. Each PlayItem specifies a play period defined by a play start point (IN point) and a play end point (OUT point) of each clip. The play order of the play periods is specified by arranging a plurality of PlayItems in time axis in the PlayList. PlayItems referencing different clips may be contained in a single PlayList.

The reference relationship between the clip and the PlayList may be freely set. For example, a single clip may be referenced from two PlayLists different in the IN point and the OUT point. The reference relationship may be freely set between the title and the MovieObject. The PlayLists are divided into two major types, namely, a real PlayList and a virtual PlayList depending on the reference relationship with the clip.

The real PlayList is the one for the original title and has PlayItems of video streams, photographed and recorded by the video camera, in the order of recording.

The virtual PlayList is the one for producing a user-defined PlayList through non-destructive editing. The virtual PlayList has no clip (AV stream) thereof and the PlayItem in the virtual PlayList indicates a clip or a portion of the clip registered in any of the real PlayLists. More specifically, the user can extract a required play period from a plurality of clips and edit the PlayItems indicating the periods into a virtual PlayList.

The clipAvStream file stores a stream recorded in the MPEG-TS format on the information recording medium 180. The video data is stored in this file.

The clip information file is present in association with the clipAVStream file and contains information relating to information required to reproduce an actual stream.

As described above, the index file, the MovieObject file, the PlayList file, the CipInformation file, and the clipAvStream file are recorded in accordance with the AVCHD format.

The designates of these files and data are described for exemplary purposes only, and other designates may be used. The content of each file and data are described below:

(1) AV stream (CipAVStream): Content data (2) Clip information (CipInformation): The clip information corresponds to the AV stream on a one-to-one correspondence basis, and defines an attribute of the corresponding AV stream. For example, the CipInformation file contains coding, size, time to address conversion, play management information, time map, etc.

(3) Play item (PlayItem): The play item contains data specifying a play start point and a play end point of the CipInformation.

(4) Play list (PlayList): The play list contains at least one PlayItem.

(5) Mark: A mark is typically present in the PlayList and indicates time point of play content. A period from one mark to a next mark is typically referred to as a chapter.

(6) Movie object (MovieObject): MovieObject is a set of commands for controlling playing.

(7) Title: Title is a set of PlayLists (recognizable by the user).

In the discussion that follows, data and files having the above-described content are the AV stream (clipAVStream), the clip information (ClipInformation), the play item (PlayItem), the play list (PlayList), the mark, the movie object (MovieObject), and the title. The present invention is applicable to the structure having substantially the same content as described above.

Figure 3:
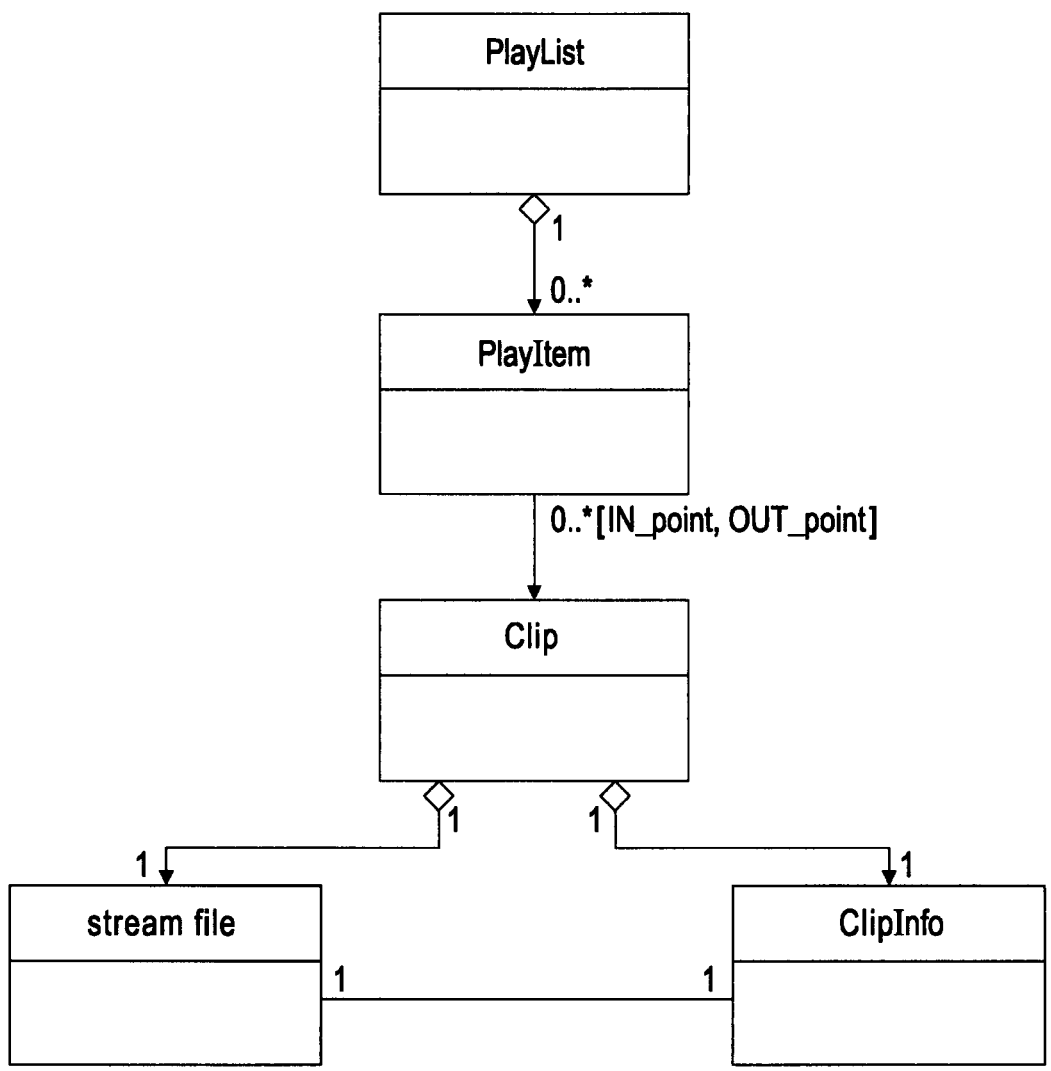
FIG. 3 illustrates a unified modeling language (UMI) indicating a PlayList, PlayItem, Clip, ClipInformation, and ClipAVStrem in accordance with one embodiment of the present invention.

FIG. 3 illustrates a unified modeling language (UML) indicating the relationship of the PlayList, the PlayItem, the Clip, the CipInformation, and the clipAvStream discussed with reference to FIG. 2. The PlayList is related to at least one PlayItem, and one PlayItem is related to one clip. A plurality of PlayItems different in the start point and/or the end point may be related to a single clip. A single clipAVStream file can be referenced from a single clip. The clipAVStream file and the CipInformation file are related to each other on a one-to-one correspondence basis. By defining the structure in this way, a non-destructive play order may specified with any portion of the data reproduced without modifying the clipAVStream file.

Figure 4:
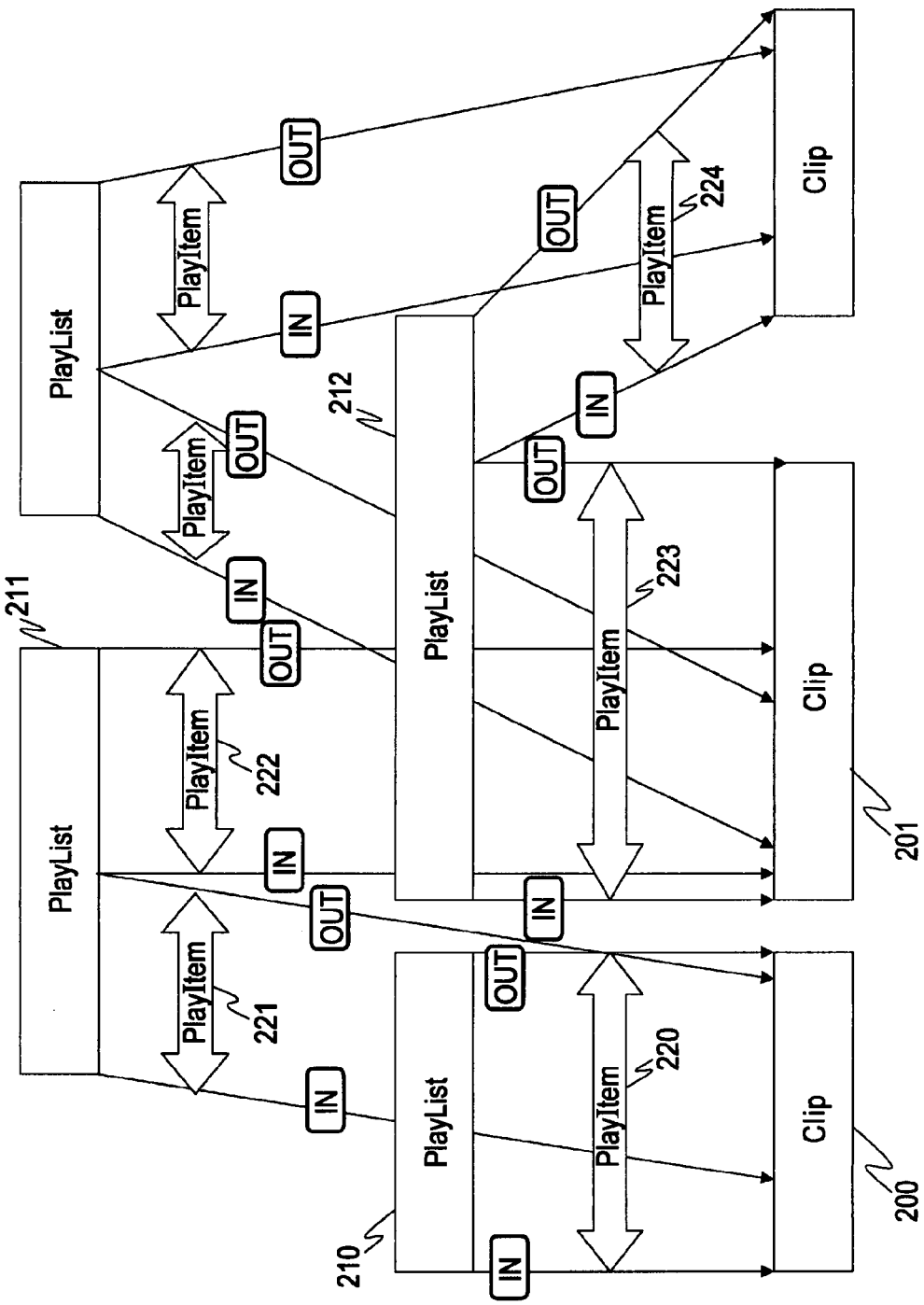
FIG. 4 illustrates a reference relationship of a play list to a clip in accordance with one embodiment of the present invention.

As shown in FIG. 4, the same clip may be referenced from a plurality of PlayLists. A single PlayList may specify a plurality of clips. The clip may be referenced by the IN point and the OUT point indicated by the PlayItem in the PlayList. As shown in FIG. 4, a clip 200 is referenced by a PlayItem 220 in a PlayList 210 while a period defined by the IN point and the OUT point of a PlayItem 221, out of the PlayItems 221 and 222 forming a PlayList 211 is referenced. In a clip 201, a period thereof defined by the IN point and the OUT point of the PlayItem 222 in the PlayList 211 is referenced, and a period thereof defined by the IN point and the OUT point of a PlayItem 223, out of PlayItems 223 and 224 in a PlayList 212 is referenced.

Figure 5:
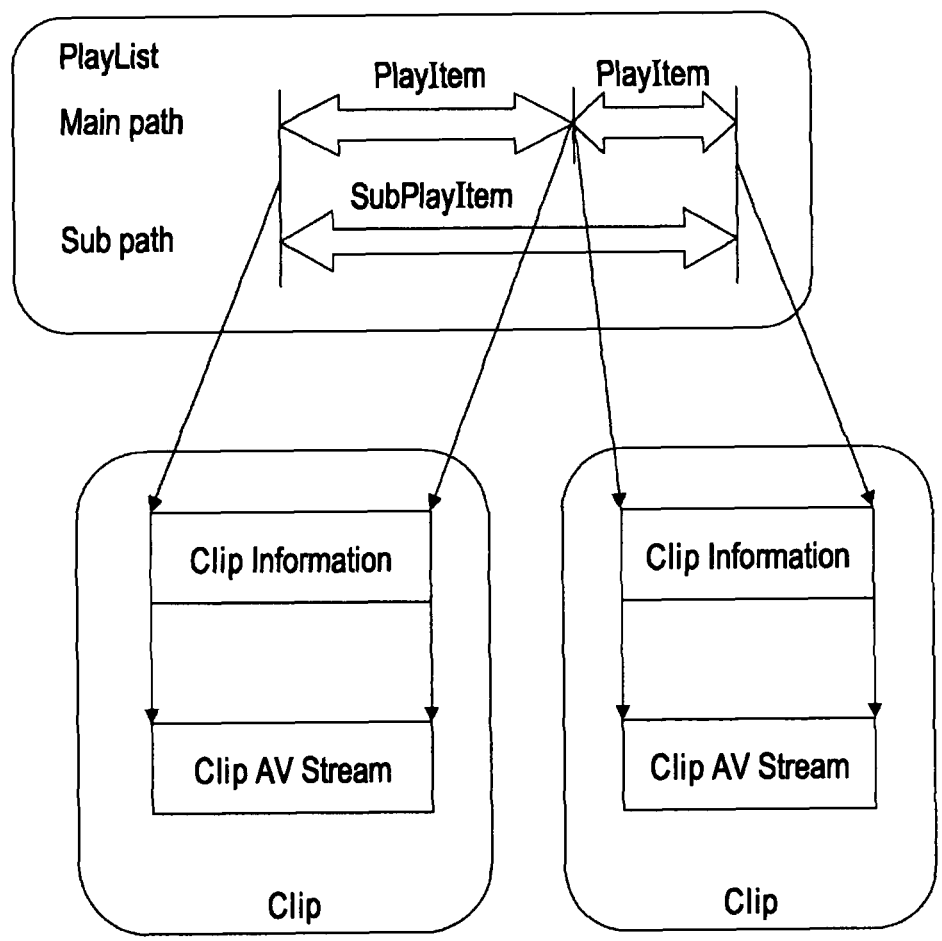
FIG. 5 illustrates a relationship of a main path and a sub path set in the play list, and the clip in accordance with one embodiment of the present invention.

As shown in FIG. 5, the PlayList may have a sub path corresponding to a sub PlayItem in a way similar to the relationship between the main path and the PlayItem to be mainly reproduced. For example, an after-recording PlayItem attached to the PlayList may be contained as a sub PlayItem in the PlayList. As will be described in detail later, the PlayList can contain a sub PlayItem only when a predetermined condition is satisfied.

Figure 6:
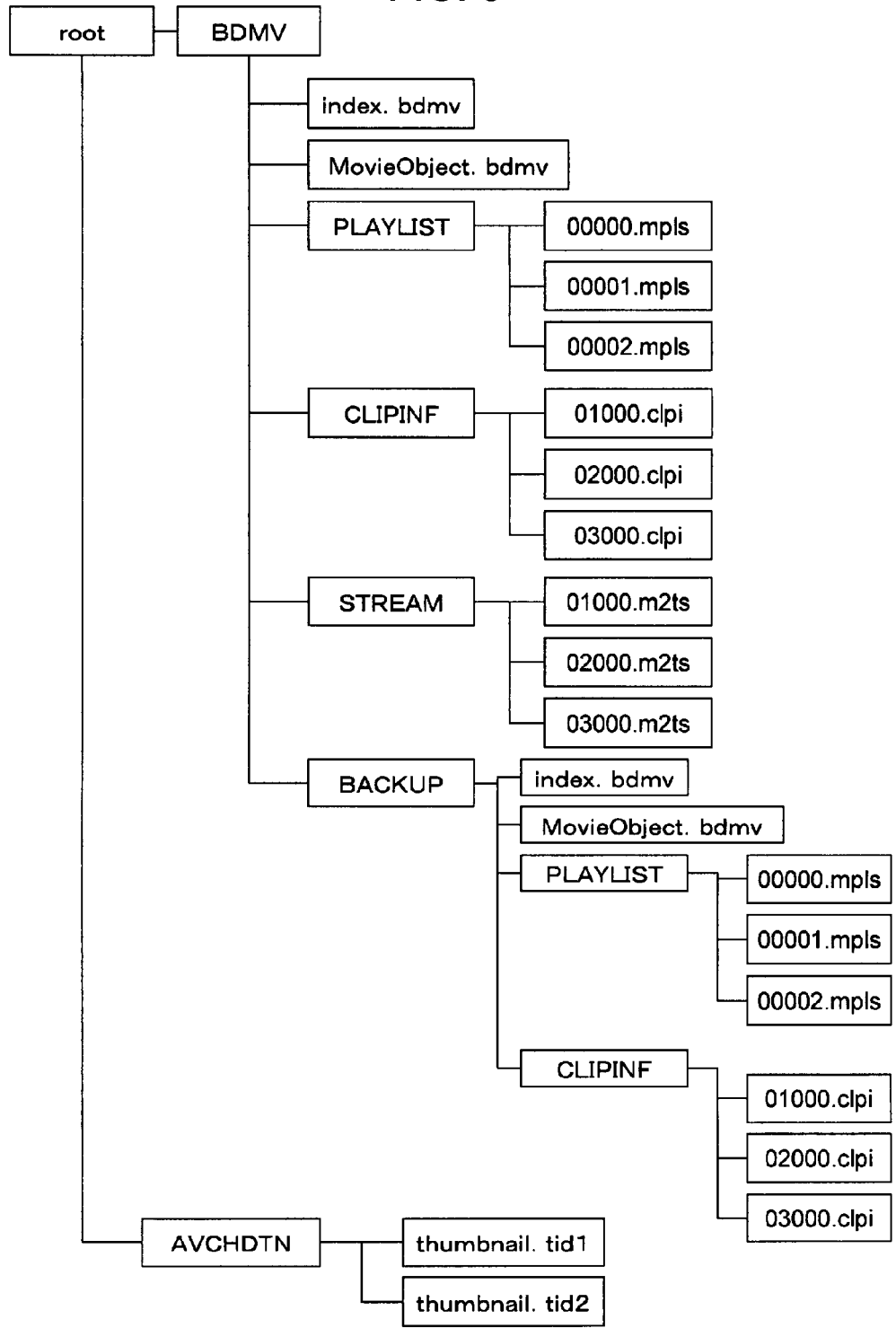
FIG. 6 illustrates a management structure of files recorded on the information recording medium in accordance with one embodiment of the present invention.
Figure 8A:
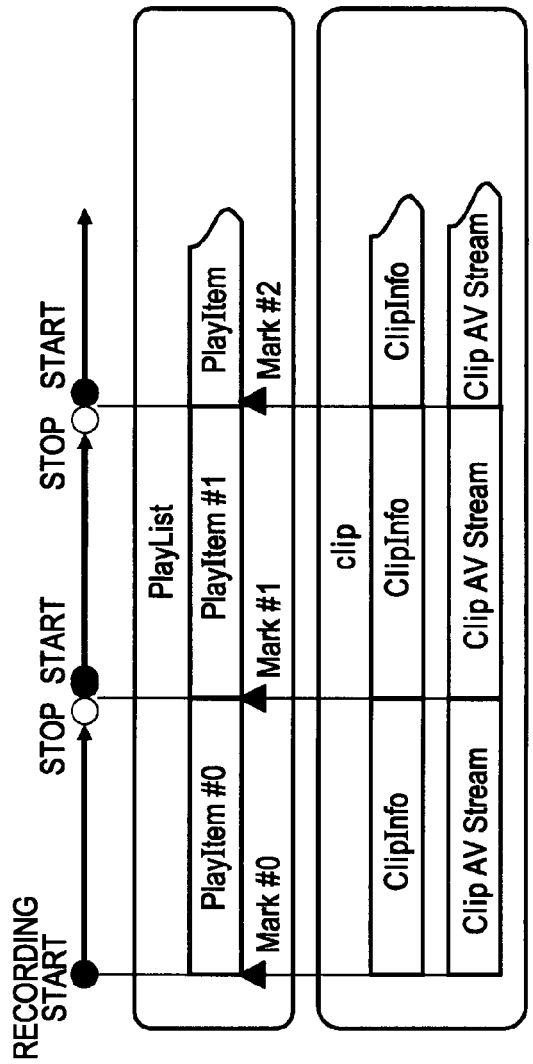
FIGS. 8A and 8B illustrate a procedure in accordance with which the play list is generated together with the clip of an AV stream in step with photographing and recording operations of the video camera in accordance with one embodiment of the present invention.
Figure 8B:
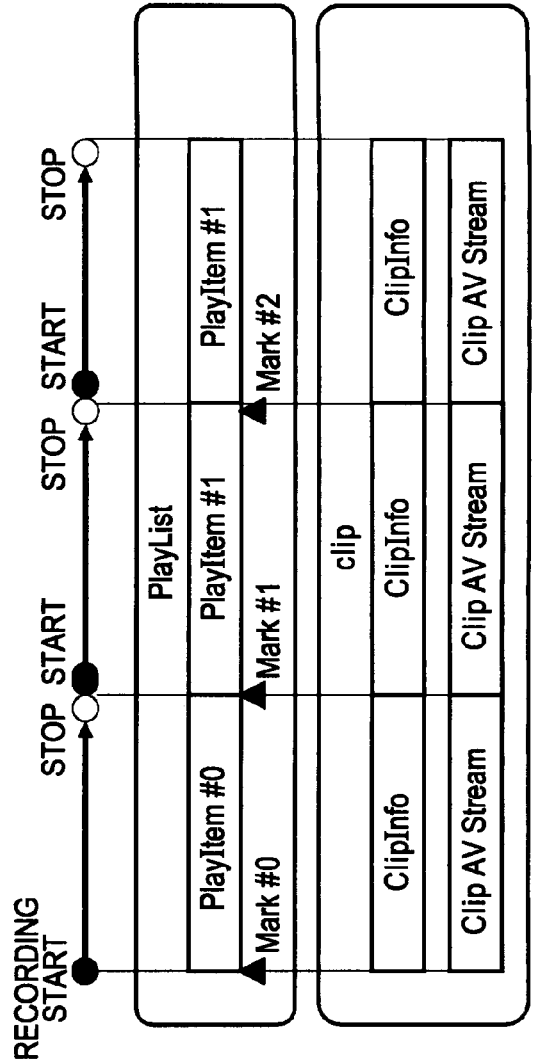

A management structure of a file to be recorded on the information recording medium 180 is described below with reference to FIG. 6. As described above with reference to FIGS. 2 through 4, the data to be recorded on the information recording medium 180 includes the MovieObject, the PlayList, and the clip. The clip includes the CipInformation file and clipAVStream file. The files are managed by layer. One directory (a root directory in FIG. 6) is created on the information recording medium 180. The directories under the root directory are a range controlled by a single recording and reproducing system.

Arranged under the root directory are a BDMV directory and an AVCHD TN directory. A thumbnail file having a representative image of a clip contracted to a predetermined size is arranged under the AVCHD TN directory. The data structure discussed with reference to FIG. 2 is stored under the BDMV directory.

Only two files, namely, an index.bdmv file and a MovieObject.bdmv file, can be arranged under the BDMV directory. The directories arranged under the BDMV directory are a PLAYLIST directory, a CLIPINF directory, a STREAM directory, and a BACKUP directory.

The content of the BDMV directory is described in the index.bdmv file. The Movieobject.bdmv file stores information regarding at least one movie object.

The PLAYLIST directory contains a database of the PlayList. More specifically, the PLAYLIST directory contains a play list file xxxxx.mpls as a file relating to a movie play list. The play list file xxxxx.mpls is created for each of the movie play lists. In the file name, "xxxxx" preceding the period (".") is a five digit number, and "mpls" following the period is an extension fixed to this type of file.

The CLIPINF directory contains a database of each clip. More specifically, the CLIPINF directory contains a clip information file "zzzzz.clpi" corresponding to each clipAvStream file. In the file name, "zzzzz" preceding the period (".") is a five digit number, and "clpi" following the period is an extension fixed to this type of file.

The STREAM directory contains an AV stream file as a body. More specifically, the STREAM directory contains a clip AV stream file corresponding to each clip information file. The clip AV stream file contains a moving picture experts group (MPEG) 2 transport stream (hereinafter referred to as MPEG2 TS), and has a file name "zzzzz.m2ts." In the file name, "zzzzz" preceding the period is identical to that of the corresponding clip information file to allow the correspondence between the clip information file and the clip AV stream file to be easily recognized.

The BACKUP directory contains backup data corresponding to the index.bdmv file, the MovieObject.bdmv file, the PLAYLIST directory, and the CLIPINF directory.

The backup data is backed up in the sequence of a finalize process of FIG. 9 to be described later. Through the backup process, the index.bdmv file and the MovieObject.bdmv file, both under the /BDMV/ directory, the files under the /BDMV/PLAYLIST directory and the files under the /BDMV/CLIP- INF are copied under the BACKUP directory. FIG. 6 illustrates the structure of the BACKUP directory containing the full backup data. The BACKUP directory has neither directory nor files thereunder in the non-backup state thereof. More specifically, the BACKUP directory takes one of two states, namely, backup state and non-backup state as discussed below:

(1) Backup State

The BACKUP directory contains copies of the index.bdmv file and the Movieobject.bdmv file under the /BDMV/directory, the copies of all files under the /BDMV/PLAYLIST/ directory and the copies of all files under the /BDMV/CLIP-INF/directory.

(2) Non-Backup State

The BACKUP directory has neither file nor directory thereunder.

The AVCHD TN directory can contain two types of thumbnail files, namely, a thumbnail.tid1 file and a thumbnail.tid2 file. The thumbnail.tid1 file contains a thumbnail image encoded in accordance with a predetermined method. The thumbnail.tid2 file contains an unencoded thumbnail image. For example, a thumbnail image corresponding to a clip the user has photographed with a video camera is copy free and needs no encoding, and is thus contained in the thumbnail.tid2 file.

A generation process of generating the PlayList together with the AV stream in step with the photographing and recording of the video by the video camera is described below with reference to FIGS. 7A and 7B and FIGS. 8A and 8B.

FIGS. 7A and 7B and FIGS. 8A and 8B illustrate the generation process of the clip and the play list performed when the user starts and stops a recording process. As shown in FIGS. 7A and 7B and FIGS. 8A and 8B, one PlayItem is generated in a period from when the user starts the recording process to when the user stops the recording process. One clip AV stream file is generated in accordance with one session of the photographing and recording operation. Along with this session, the clip information file is also generated. One clip is a unit requiring reproduction under which continuous synchronized playing, namely, real-time play is guaranteed.

Each time the user starts recording, an entry mark is attached to the head of the PlayItem. The entry mark in the PlayList is referred to as a PlayList mark (PLM). Within one PlayList, PlayItems and the marks are serially numbered. Although the head of each PlayList for a moving image must be tagged with the respective entry mark, a predetermined operation can shift the entry mark in time axis.

Each entry mark represents an entry position at which the user has accessed the stream. Periods, each period delimited by adjacent entry marks (and a period from last mark to the end of the final PlayItem) are "chapters" as a minimum editing unit viewed from the user. The play order of the PlayLists is defined by arranging both the PlayItems and the entry marks in the play order.

The finalize process is described below. The finalize process may be performed in the configuration of FIG. 1 when new data recording, namely additional data storage onto the information recording medium 180 is decided not to be performed after stopping of the data recording thereon. The finalize process is thus performed to disable additional data storage. For example, when a finalize process start request is issued by the user via the input-output interface 114 of FIG. 1, the finalize process is started under the control of the recording and reproducing controller 110. Even if the finalize process is performed, a finalize canceling process can restore an additional storage enabled state on the information recording medium 180.

Figure 10A:
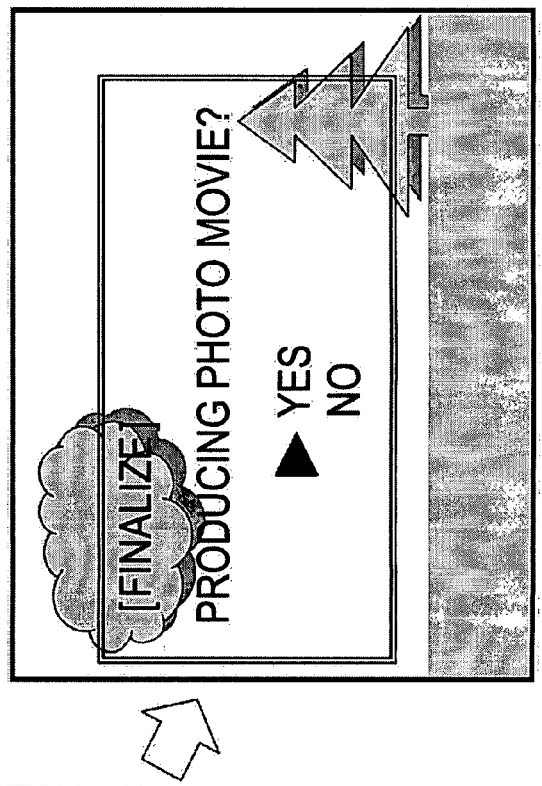
FIGS. 10A and 10B illustrate an example of user interface (UI) for inputting a photo movie production command in accordance with one embodiment of the present invention.

The finalize process is described below with reference to a flowchart of FIG. 9. In step S101, the main controller 111 determines whether a photo movie production request has been input. For example, the main controller 111 controls a display via the input-output interface 114 to display a message urging the user to input the user's decision and then determines the presence or absence of the photo movie production request. More specifically, as shown in FIG. 10A, the main controller 111 causes the display to display the message, thereby urging the user to decide whether to produce the photo movie. FIG. 10A illustrates a display screen for the start request for the finalize process. If the presence or absence of the photo movie is input on this screen, the display shifts to the screen of FIG. 10B. The user can thus instruct the apparatus whether to produce the photo movie.

Returning the flowchart of FIG. 9, the discussion of the finalize process continues. If it is determined in step S101 that the production request for the photo movie has been issued, the production process of the photo movie is performed in step S102. The production process of the photo movie will be described in detail later.

In step S103, the main controller 111 determines whether the request to perform the finalize process without menu has been issued. The finalize process is performed with or without menu.

Figure 10B:
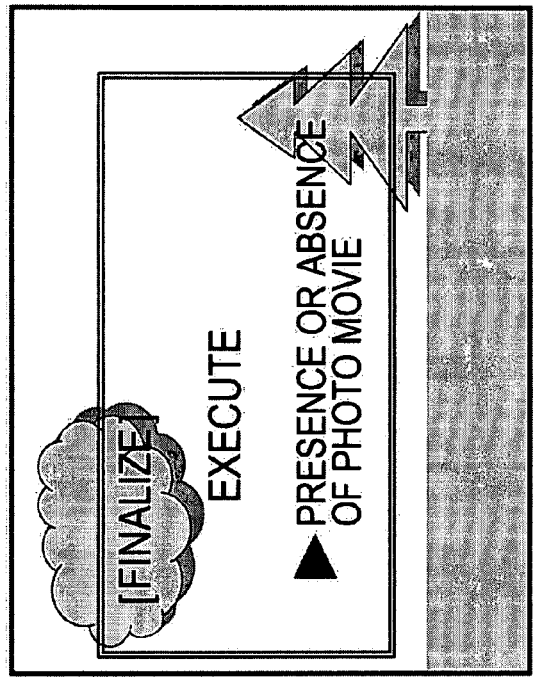

The menu is displayed on an opening screen during the playing of the information recording medium 180, and includes titles of content files and representative images of moving images stored on the information recording medium 180. During the finalize process, the user can specify whether to produce the menu. For example, in a manner similar to the one as shown in FIGS. 10A and 10B, data specifying the presence or absence of the menu is displayed on the display and the menu production is performed in response to an input from the user.

If it is determined in step S103 that the finalize process without menu is not requested, processing proceeds to step S104 to perform the menu production process. The backup data is recorded in next steps S105 through S107. First in step S105, the index.bdmv file and the Movieobject.bdmv file in the directory structure previously discussed with reference to FIG. 6 are copied to a index.bdmv file and a MovieObject.bdmv file in the BACKUP directory set as a recording directory of the backup data.

In step S106, the clip information file recorded on the CLIPINF directory is recorded as the backup data in the CLIPINF directory in the BACKUP directory. In step S107, the play list information recorded in the PLAYLIST directory is recorded as the backup data in the PLAYLIST directory in the BACKUP directory.

In step S108, the main controller 111 determines whether to perform a padding process. The padding process is performed to write dummy data onto a data unrecorded area of the information recording medium 180 such as a disk. Depending on design, some apparatuses for playing a disk cannot reproduce data if a remaining data recording area of the disk becomes small. To avoid such a problem, the padding process is performed to write the dummy data onto the data unrecorded area of the disk. The status of the recording area of the information recording medium 180 is detected, and if a data unrecorded area is large, the main controller 111 determines that the padding process needs to be performed. In step S109, the padding process is performed.

In step S110, the file system is updated. The update process of the file system is performed to update management information in response to data recorded on the information recording medium 180. In step S111, the main controller 111 determines whether a border closing process is required or not. The border closing process is performed on the information recording medium 180 to make recognizable lead-in and lead-out points indicating a data recording area on the disk. Whether to perform the border closing process is determined based on the type of each information recording medium 180. If it is determined that the border closing process is required, the border closing process is performed in step S112.

In this way, the finalize process is performed. Through the finalize process, the additional storage to the information recording medium is inhibited. As previously discussed, even if the finalize process is performed, the finalize cancel operation can be performed to cancel the finalized state. The finalize cancel operation can restore the information recording medium 180 to an additional storage enabled state.

The photo movie production process is described below. The photo movie production process is performed to read the still image data recorded on the information recording medium, encode the read still image data, and then re-write the encoded still image data onto the information recording medium. The photo movie production process is performed in the above-described finalize process. The photo movie production process can be performed at a timing different from the execution timing of the finalize process. For example, the photo movie production process can be performed as a data editing process. When the user enters a photo movie production request via the input-output interface 114 of FIG. 1, the photo movie production process is started under the control of the recording and reproducing controller 110.

The sequence of the photo movie production is described below with reference to a flowchart of FIG. 11. In step S201, the PlayList of the photo movie is produced on the RAM 113. The PlayList is discussed with reference to the data format illustrated in FIG. 2 and corresponds to the content as the AV stream. The PlayList corresponding to the photo movie is generated on the RAM 113.

In step S202, the clip information for the photo movie is produced on the RAM 113. As previously discussed, the clip information is a file defining the attribute of the AV stream. The clip information as an attribute defining file corresponding to the photo movie is produced on the RAM 113.

In step S203, the recording and reproducing controller 110 shifts the encoder and decoder 140 of FIG. 1 to a state to be ready to decode the still image and output outward the decoded still image. In step S204, the recording and reproducing controller 110 shifts the input-output signal controller 150 to a state to be ready to receive the signal from the encoder and decoder 140. In step S205, the recording and reproducing controller 110 reads a stream of still image recorded on the information recording medium 180 via the medium controller 120.

In step S206, the recording and reproducing controller 110 decodes the still image stream, read from the information recording medium 180, with the encoder and decoder 140, and then outputs the decoded still image stream to the input-output signal controller 150. The input-output signal controller 150 captures the input still image in step S207 and outputs the captured still image to the encoder and decoder 140 in step S208.

In step S209, the encoder and decoder 140 produces a stream corresponding to the photo movie by performing the encoding process to encode the still image input from the input-output signal controller 150 into encoded data in a moving image format (such as MPEG-4 part 10 Advanced Video Coding (AVC)/H. 264 format), and then stores the produced stream onto the recording and reproducing working memory 130.

In step S210, the medium controller 120 records on the information recording medium 180 an I picture from the encoded data recorded on the recording and reproducing working memory 130. The I pictures are components of the I picture, a P picture, and a B picture forming MPEG data, and thus important pictures in the MPEG encoded data.

In step S211, the recording and reproducing controller 110 adds to the PlayList for the photo movie the PlayItems corresponding to the number of I pictures generated in the encoding process. More specifically, in the PlayList of the photo movie, a PlayItem is set for each I picture forming the photo movie.

In step S212, the information regarding each I picture produced in the encoding process is added to the clip information for the photo movie. The clip information is a file defining the attribute of the AV stream. For example, the clip information contains coding, size, time to address conversion, play management information, time map, etc. These pieces of information are produced for each I picture and recorded in the clip information.

In step S213, the recording and reproducing controller 110 determines whether the photo movie production process has been completed on all still images recorded on the information recording medium 180. If it is determined in step S213 that the photo movie production process has not been completed, processing returns to step S203 to perform step S203 and subsequent steps on unprocessed data. If it is determined in step S213 that the photo movie production process has been completed on all still images recorded on the information recording medium 180, processing proceeds to step S214. The photo movie PlayList produced on the RAM 113 is recorded on the information recording medium 180.

In step S215, the photo movie clip information produced on the RAM 113 is written onto the information recording medium 180. In step S216, an update process is performed to record information corresponding to the produced photo movie in the movie object file. The movie object file is a set of commands for performing play control. The update process is thus performed to record a command responsive to a newly produced photo movie in the movie object on the information recording medium 180. In step S217, in the index file, information responsive to the photo movie is updated and written on the information recording medium 180.

The photo movie is thus produced, and then recorded onto the information recording medium 180.

The menu production process is described in detail below. As previously discussed, the menu production process may be performed in the finalize process. The menu production process may be performed at a timing different from the timing of the finalize process. For example, the menu production process may be performed as the data editing process. When the user inputs a menu production request via the input-output interface 114 of FIG. 1, the menu production process is started under the control of the recording and reproducing controller 110.

The menu production process is described below with reference to a flowchart of FIG. 12. In step S251, the PlayList for the menu is produced on the RAM 113. The PlayList is discussed with reference to the data format illustrated in FIG. 2 and corresponds to the content as the AV stream. The PlayList corresponding to the menu is generated on the RAM 113.

In step S252, the clip information for the menu is produced on the RAM 113. As previously discussed, the clip information is a file defining the attribute of the AV stream. The clip information as an attribute defining file corresponding to the menu is produced on the RAM 113.

In step S253, the recording and reproducing controller 110 shifts the encoder and decoder 140 of FIG. 1 to a state to be ready to decode the still image and output outward the decoded still image. In step S254, the recording and reproducing controller 110 shifts the input-output signal controller 150 to a state to be ready to receive the signal from the encoder and decoder 140. In step S255, the recording and reproducing controller 110 reads a stream of still image recorded on the information recording medium 180 via the medium controller 120.

In step S256, the recording and reproducing controller 110 decodes the representative image stream, read from the information recording medium 180, with the encoder and decoder 140, and then outputs the decoded representative image stream to the input-output signal controller 150. Steps S255 and S256 are repeated by the number of times equal to the number of chapters on each page. In other words, a representative image is selected on a per chapter basis and displayed on the menu.

The input-output signal controller 150 captures the input still image in step S257 and outputs the captured still image to the encoder and decoder 140 in step S258.

In step S259, the encoder and decoder 140 produces a stream corresponding to the menu by performing the encoding process to encode the representative image input from the input-output signal controller 150 into encoded data in a moving image format (such as MPEG04 part 10 Advanced Video Coding (AVC)/H. 264 format), and then stores the produced stream onto the recording and reproducing working memory 130.

In step S260, the medium controller 120 records on the information recording medium 180 an I picture from the encoded data recorded on the recording and reproducing working memory 130. The I pictures are components of the I picture, a P picture, and a B picture forming MPEG data, and thus important pictures in the MPEG encoded data.

In step S261, the recording and reproducing controller 110 adds to the PlayList for the menu the PlayItems corresponding to the number of I pictures generated in the encoding process. More specifically, in the PlayList of the menu, a PlayItem is set for each I picture forming the menu.

In step S262, the information regarding each I picture produced in the encoding process is added to the clip information for the menu. The clip information is a file defining the attribute of the AV stream. For example, the clip information contains coding, size, time to address conversion, play management information, time map, etc. These pieces of information are produced for each I picture and recorded in the clip information.

In step S263, the recording and reproducing controller 110 determines whether the menu production process has been completed on all pages forming the menu. If it is determined in step S263 that the menu production process has not been completed, processing returns to step S253 to perform step S253 and subsequent steps on unprocessed data. If it is determined in step S263 that the menu production process has been completed on all pages, processing proceeds to step S264. The menu PlayList produced on the RAM 113 is recorded on the information recording medium 180.

In step S265, the menu clip information produced on the RAM 113 is written onto the information recording medium 180. In step S266, an update process is performed to record information corresponding to the produced menu in the movie object file. The movie object file is a set of commands for performing play control. The update process is thus performed to record a command responsive to a newly produced menu in the movie object on the information recording medium 180. In step S267, in the index file, information responsive to the menu is updated and written on the information recording medium 180.

The menu is thus produced, and then recorded onto the information recording medium 180.

The recording and reproducing controller 110 determines whether the information recording medium 180 is in the finalized state inhibiting the additional storage process. This determination process is performed under the control of the recording and reproducing controller 110 of FIG. 1 by examining data required for the determination process from the information recording medium 180. The sequence of the finalized state determination process is described below with reference to a flowchart of FIG. 13.

Figure 13:
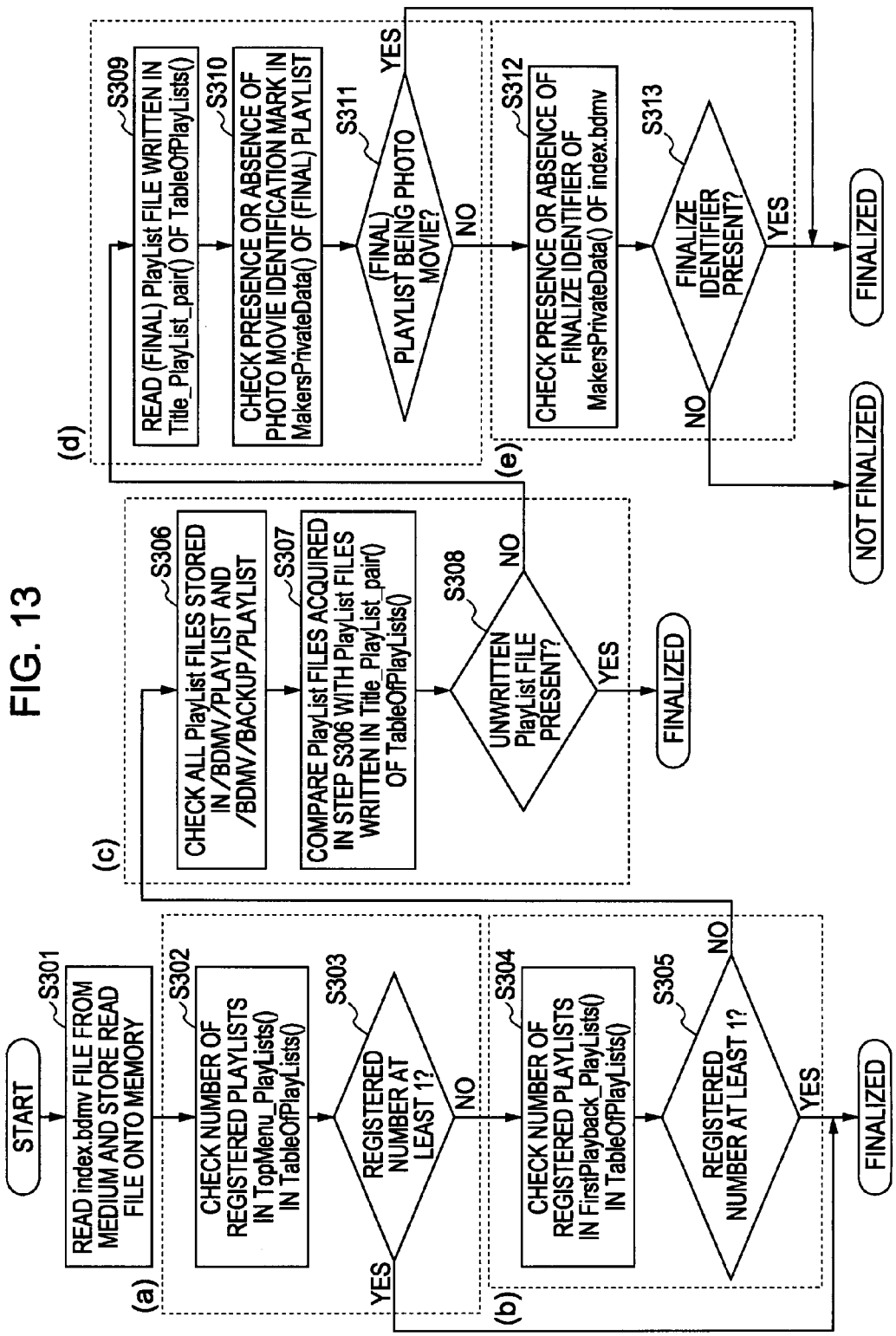
FIG. 13 is a flowchart illustrating a sequence of a finalized state determination process in accordance with one embodiment of the present invention.

Portions (a) through (e) surrounded by broken line boxes in the flowchart of FIG. 13 are separate finalized state determination processes. At least one determination process from the determination processes (a) through (e) may be combined depending on the system and product specifications. In the flowchart of FIG. 13, all determination processes (a) through (e) are executed.

Determination Process (a)

In step S301, the index.bdmv file recorded on the information recording medium 180 is read and then stored on the RAM 113. The index.bdmv file contains index information such as a title. For example, if one of the menu production and the photo movie production is performed in the finalize process, the index information such as the title corresponding to one of the menu and the photo movie is contained in the index.bdmv file.

In step S302, the number of registered PlayLists in a top menu play list "TopMenuPlayLists ( )" in a play list table field "TableOfPlayLists ( ) set in the index.bdmv file is examined. If it is determined in step S303 that the number of registrations is at least one, the information recording medium 180 is determined to be in the finalized state with the additional storage process inhibited.

Determination Process (b)

In step S304, the number of registered PlayLists in a first play back play list "FirstPlaybackPlayLists ( )" in a play list table field "TableOfPlayLists ( ) set in the index.bdmv file is examined. If it is determined in step S305 that the number of registrations is at least one, the information recording medium 180 is determined to be in the finalized state with the additional storage process inhibited.

The determination processes (a) and (b) correspond to an examination process performed based on the recorded information in the index.bdmv file to examine whether the menu has been produced or not. If the menu has been produced, the information recording medium 180 is determined to be in the finalized state in which the additional storage process is inhibited.

In step S267 in the menu production process discussed with reference to FIG. 12, the index.bdmv file is updated and the updated index.bdmv file is recorded on the information recording medium 180. In the update process, information regarding the menu production process is recorded in the index.bdmv file. Whether the menu has been produced is determined based on the recorded information in the determination processes (a) and (b). If it is determined that the menu has been produced, the information recording medium 180 is in the finalized state with the additional storage process inhibited.

The structure of the index.bdmv file is described below with reference to FIG. 14. FIG. 14 illustrates a syntax of the index.bdmv file. As shown, the syntax here is described in C language used as a programming language of computers. The same is true of other syntaxes to be discussed later.

As shown in FIG. 14, type information "TypeIndicator" indicating that the file is an index file is recorded in the index.bdmv file. The type information is followed by version information, start address information of each data "IndexeStartAddress" and "ExtensionDataStartAddress," and then, as actual data, application information block "ApplInfoBDMV( )," index information block "Indexes( )" and extension data block "blkExtensionData( )" 301.

FIG. 15 illustrates a syntax of the extension data block "blkExtensionData( )" 301 in the index.bdmv file of FIG. 14. The extension data block can contain a variety of extension data that cannot be described in another blocks in the index information. As shown in FIG. 15, described as the extension data is a value indicating format information "AVCHD" of the recorded data in an ID1 field and version information in an ID2 field, each field set as an identification information data field. A data block 310 can contain a variety of extension data.

FIG. 16 illustrates an example of the data block 310. The data block 310 may contain data unique to a maker. The data block 310 of FIG. 16 includes UI application information block "UIAppInfoAVCHD( )" in AVCHD, play list table information block "TableOfPlayLists( )" 321, and maker private data block "MakersPrivateData( )" 322.

FIG. 17 illustrates the play list table information block "TableOfPlayLists( )" 321 in the extension data block of the index information file of FIG. 16. Described herein is information relating to the PlayList. PlayList information of a first playback and a top menu is described in the first playback information field "FirstPlayback_PlayLists( )" 331 and the top menu play list information field "Topmenu_PlayLists( )" 331 in the play list table information block "TableOfPlayLists( )" in the extension data block of the index information file of FIG. 17. The PlayList for the first playback is called and executed at the startup of the information recording medium 180. The PlayList for the top menu is called and executed in accordance with a menu display process. Each of these PlayList is set when the menu is produced, and is not produced when the menu is not produced.

FIG. 18 illustrates the structure of the first playback play list field 331 and top menu playlist information field 331 in the play list table information block "TableOfPlayLists( )" of the extension data block of the index information file of FIG. 17. The first playback play list field 331 and the top menu playlist information field 331 are identical in structure, and the syntax of only one of the two is shown.

If the syntax of FIG. 18 corresponds to the first playback play list field "FirstPlayback_PlayLists( )," information relating to the PlayList for the first playback, namely, information relating to the PlayList called and executed at the start of the information recording medium 180 is recorded herein. More specifically, when the menu production process discussed with reference to FIG. 12 is performed, information based on the menu produced in the update process of the index file in step S267 is recorded. For example, when the PlayList for the menu is produced, "1" is set in the number of play list field "number of Playlist" 341 in step S267 of FIG. 12. If the PlayList for the menu is not produced, "0" is set in the number of play list field "number of Playlist" 341 in step S267 of FIG. 12.

The determination process (b), namely, steps S304 and S305, of FIG. 13 is performed to determine whether "1" is set in the number of play list field "number of Playlist" 341 in the first playback play list field "FirstPlayback_PlayLists( )" of FIG. 18. If "1" is set in the number of play lists field, the recording and reproducing controller 110 determines that the PlayList for the first playback, namely, the PlayList for the menu to be called and executed at the start of the information recording medium 180 has been produced. The recording and reproducing controller 110 thus determines that the finalize process discussed with reference to FIG. 9, namely, the process exhibiting the additional storage on the medium has been performed.

If the syntax of FIG. 18 corresponds to the top menu play list information field "TopMenu_Playlists( )," information relating to the PlayList for the top menu, namely, information relating to the PlayList called and executed in accordance with the menu display process is recorded. More specifically, when the menu production process discussed with reference to FIG. 12 is performed, information based on the menu produced in the update process of the index file in step S267 is recorded. For example, when the PlayList for the menu is produced, "1" is set in the number of play list field "number of Playlist" 341 in step S267 of FIG. 12. If the PlayList for the menu is not produced, "0" is set in the number of play list field "number of Playlist" 341 in step S267 of FIG. 12.

The determination process (a), namely, steps S302 and S303, of FIG. 13 is performed to determine whether "1" is set in the number of play list field "number of Playlist" 341 in the first playback play list field "FirstPlayback_PlayLists( )" of FIG. 18. If "1" is set in the number of play lists field, the recording and reproducing controller 110 determines that the PlayList for the top menu, namely, the PlayList for the menu to be called and executed in accordance with the menu display process has been produced. The recording and reproducing controller 110 thus determines that the finalize process discussed with reference to FIG. 9, namely, the process exhibiting the additional storage on the medium has been performed.

Returning to the flowchart of FIG. 13, the discussion of the finalize determination process continues.

Determination Process (c)

The determination process (c) includes steps S306-S308. In step S306, the recording and reproducing controller 110 examines all titles of the PlayLists stored in the PLAYLIST directory and the PLAYLIST directory contained in the BACKUP directory in the directory structure discussed with reference to FIG. 6.

In step S307, the recording and reproducing controller 110 acquires data in the play list table information block "TableOfPlayLists( )" 321 (FIG. 16) contained in the data block 310 in the extension data block "blkExtensionData( )" 301 (FIG. 15) of the index.bdmv file of FIG. 14, i.e., acquires the title of the PlayList registered in a play list pair title information field "Title_PlayList_Pair( )" 332 of FIG. 17. The recording and reproducing controller 110 checks the acquired title against the PlayList title acquired in step S306. The title information of the registered PlayLists corresponding to image content heretofore photographed is recorded in the play list pair title information field "Title_PlayList_Pair( )" 332 in the data of FIG. 17. Pair means a pair of the PlayList and the title.

In step S308, the recording and reproducing controller 110 checks the PlayList title acquired from the existing PlayList in step S306 against the registered PlayList title acquired from the play list pair title information field "Title_PlayList_Pair( )" 332 in step S307. If the presence of a PlayList unregistered in the play list pair title information field "Title_PlayList_Pair( )" 332 of the index file is confirmed, the recording and reproducing controller 110 determines the information recording medium 180 is in the finalized state with the additional storage process inhibited. If all existing PlayLists are registered, processing proceeds to step S309.

The determination process (c) is performed to examine the tile of the PlayList recorded on the information recording medium 180 against the PlayList title registered in the play list pair title information field "Title_PlayList_Pair( )" 332 of the index file. It is likely that the PlayList unregistered in the play list pair title information field "Title_PlayList_Pair( )" 332 is a PlayList corresponding to the above-described menu. In such a case, the recording and reproducing controller 110 determines that the finalize process with the menu production involved discussed with reference to FIG. 9 has been performed.

Determination Process (d)

The determination process (d) includes steps S309-S311. The determination process (d) is performed to determine whether to perform the finalize process based on whether the photo movie production process discussed with reference to FIG. 11 has been performed. As described with reference to FIG. 9, the photo movie production process is performed by collecting the still images recorded the information recording medium 180, converting the still images into moving image data, and then re-recording the moving image data onto the information recording medium 180 in the finalize process. If the photo movie is produced, the recording and reproducing controller 110 determines that the finalize process has been completed.

In step S309, the recording and reproducing controller 110 reads the data in the play list table information block "TableOfPlayLists( )" 321 (FIG. 16) contained in the data block 310 in the extension data block "blckExtensionData( )" 301 (FIG. 15) of the index.bdmv file discussed with reference to FIG. 14, namely, reads the final PlayList registered in the play list pair title information field "Title_PlayList_Pair( )" 332 in the data of FIG. 17. Only the PlayList is examined in view of workload involved. Alternatively, n-th PlayList to the final PlayList may be examined, or all PlayLists may be examined. Since the photo movie is produced during the finalize process and then registered as the final PlayList, it is sufficient if the final registered PlayList is the one corresponding to the photo movie.

In step S310, the recording and reproducing controller 110 determines the presence or absence of a photo movie identification mark of maker private data "MakersPrivateData( )" of the final PlayList. If it is determined in step S311 that the photo movie identification mark is present, the recording and reproducing controller 110 determines that the photo movie has been produced and the information recording medium 180 is in the finalized state. If no photo movie identification mark is found, processing proceeds to step S312.

The maker private data "MakersPrivateData( )" is set in each play list file. If the PlayList is the one corresponding to the photo movie, the photo movie identification mark is set in the maker private data "MakersPrivateData( )" field. FIG. 19 illustrates a syntax of the play list file.

As shown in FIG. 19, the PlayList file includes type information "TypeIndicator" followed by start address information of actual data "PlayListStartAddress" through "ExtensionDataStartAddress", and recording fields of the actual data "blkApplicationPlayList( )" through "blkExtensionData( )" 351.

FIG. 20 illustrates a syntax of an extension data block "ExtensionData( )" contained in the PlayList file. The extension data block "ExtensionData( )" of the PlayList file contains the type of data "type_indicator," a start address "PlayListMarkExt_start_address" of data recorded in the extension data block "ExtensionData( )," and as actual data recording areas, a block "PlayListMeta( )," a play list mark extension block "PlayListMarkExt( )" and a maker private data block "MakersPrivateData( )" 361.

FIG. 21 illustrates a syntax of the maker private data block "MakersPrivateData( )" 361 of the extension data block of the PlayList file shown in FIG. 20. As shown in FIG. 21, the maker private data block "MakersPrivateData( )" 361 contained in the PlayList file contains a data block "data_block" 371 as a substantial data recording area in addition to fields such as the start address of the data blocks including a data block start address "data_block_start_address" indicating the start address of the data block and the number of entries "number_of_maker_entries."

The data block "data_block" 371 contains an indication indicating that the PlayList corresponds to the photo movie. For example, the data block "data_block" 371 contains an ASCII code indicating that the PlayList corresponds to a photo movie produced by a video apparatus manufactured by an ABC company.

The finalize process may be cancelled even after the finalize process has been completed. By referencing the extension data of each PlayList, the recording and reproducing controller 110 can easily determine whether the PlayList corresponds to the photo movie. Based on the information recorded in the PlayList, the recording and reproducing controller 111 can search for and delete the actual content and the attribute data of the photo movie. More specifically, the recording and reproducing controller 110 references the PlayList to cancel the additional storage disabled state on the information recording medium 180. Based on the identification data recorded in the PlayList, the main controller 111 detects an attribute information storage file (PlayList) corresponding to the data in the moving image format produced based on the still image data. The main controller 111 deletes the content and related information of the encoded data in the moving image format produced based on the still image data. The finalize canceling process is thus quickly performed.

In steps S309-S311 in the finalized state determination process of FIG. 13, the recording and reproducing controller 110 references the PlayList as previously described, and determines whether to perform the finalize process to inhibit the additional storage process based on the determination as to whether the photo movie has been produced. With reference to FIG. 9, the photo movie production process is performed to collect the still images recorded on the information recording medium 180, convert the collected still images into the moving image data, and re-record the moving image data onto the information recording medium 180. If the photo movie has been produced, it is determined that the finalize process has been completed.

Determination Process (e)

The determination process (e) includes steps S312 and S313. In the determination process (e), the recording and reproducing controller 110 determines whether an identifier indicating the completion of the PlayList file is recorded in the maker private data "MakersPrivateData( )" of the index file. If it is determined that the identifier is recorded, the recording and reproducing controller 110 determines that the information recording medium 180 is in the finalized state.

As shown in FIG. 16, the index.bdmv file of FIG. 14 having the maker private data "MakersPrivateData( )" 322 set therewithin allows a variety of data to be recorded therewithin. When the finalize process has been completed as described with reference to FIG. 9, the identifier indicating the completion of the finalize process is recorded in the maker private data "MakersPrivateData( )" 322.

In step S312, the recording and reproducing controller 110 reads the maker private data "MakersPrivateData( )" contained in the index.bdmv file. If it is determined in step S313 that the identifier indicating the completion of the finalize process is recorded in this maker private data field, the recording and reproducing controller 110 determines that the information recording medium 180 is in the finalized state. If it is determined in step S313 that no identifier is recorded, the recording and reproducing controller 110 determines that the finalize process has not been performed.

The information processing apparatus of one embodiment of the present invention determines that the information recording medium 180 is in the finalized state with the additional storage process inhibited if one of the following states is found:

(a) "1" is set in the number of play lists "number_of_PlayLists( )" in the top menu play list field "TopMenu_PlayLists( )" of the index.bdmv file.

(b) "1" is set in the number of play lists "number_of_PlayLists( )" in the first playback play list field "FirstPlayback_PlayLists( )" of the index.bdmv file.

(c) An unregistered PlayList is present in the play list pair title information field "Title_PlayList_Pair( )" of the index.bdmv file.

(d) Information indicating the PlayList corresponding the photo movie is recorded in the maker private data "MakersPrivateData( )" of the PlayList file.

(e) Information indicating the completion of the finalize process is recorded in the maker private data "MakersPrivateData( )" of the index.bdmv file.

Figure 22B:
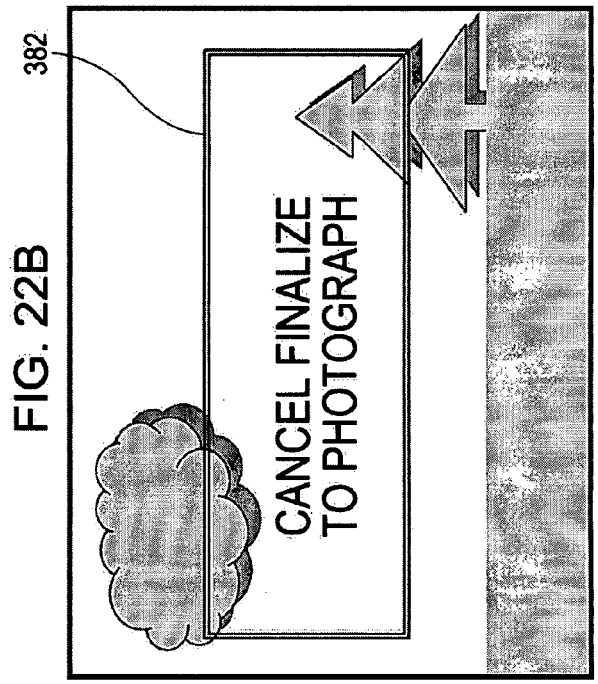
FIGS. 22A and 22B illustrate a display example notifying the finalized state.

If one of the above states (a)-(e) is found, the recording and reproducing controller 110 determines that the information recording medium 180 in the finalized state, namely, the additional storage is inhibited. In this case, the display of the information processing apparatus displays the identification information notifying that the information recording medium 180 is in the finalized state accepting no additional data for storage. The display example is shown in FIGS. 22A and 22B.

Figure 22A:
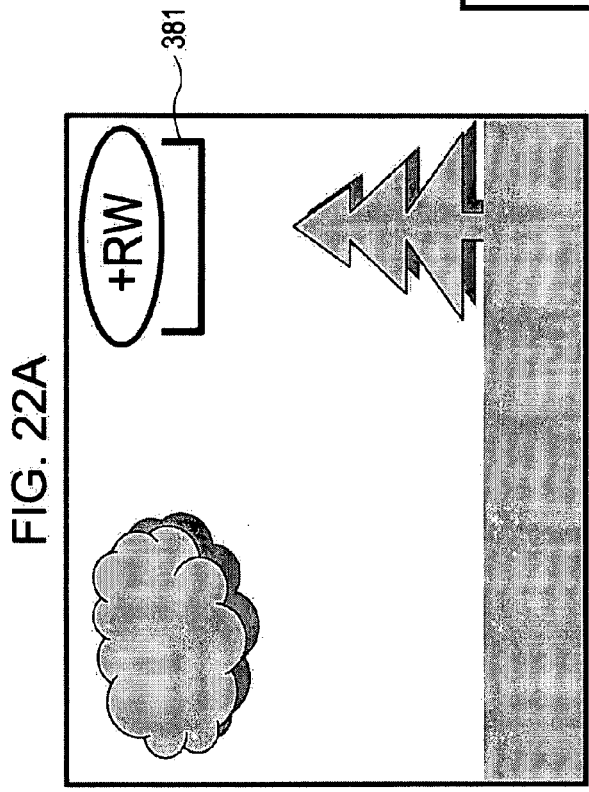

FIG. 22A illustrates an display example that is a standard display in which a finalized state display icon 381 is displayed. FIG. 22B illustrates a warning message 382 that is displayed in response to a trigger issued when the user selects a photograph start button on the video camera. Viewing these displays, the user can recognize that the additional storage cannot be performed.

FIG. 23 illustrates a process sequence based on the finalized state information at the start of the data recording on the information processing apparatus. The process of FIG. 23 is performed under the control of the main controller 111 when the main controller 111 detects the user's pressing of the photograph start button via the input-output interface 114 of FIG. 1. In step S401, the main controller 111 acquires from the RAM 113 information indicating whether the information recording medium 180 is in the finalized state. The information is the one obtained as a result of the finalized state determination process discussed with reference to FIG. 13. The finalized state determination process of FIG. 13 is performed when the information recording medium 180 is loaded or power is on, and the determination information is then stored on the RAM 113. If the finalize process is performed on a medium that is not in the finalized state, the state value on the RAM 113 is updated.

If it is determined in step S402 based on the information acquired from the RAM 113 that the information recording medium 180 is not in the finalized state, processing proceeds to step S403. The main controller 111 acquires the number of entries (files/entries) under the BDMV/BACKUP directory as a backup data storage directory in the directory structure discussed with reference to FIG. 6.

In step S404, the main controller 111 determines whether at least one entry acquired in step S403 is present. If it is determined in step S404 that at one entry is present, processing proceeds to step S407. The main controller 111 displays in step S407 on the display a message that the recording is inhibited, and then gives off an alarm sound in step S408. If it is determined in step S404 that the number of entries is zero, processing proceeds to step S405. Standard photographing process is thus performed.

If it is determined in step S402 from the finalized state information acquired from the RAM 113 that the information recording medium 180 is in the finalized state, processing proceeds to steps S406 and S408. The main controller 111 displays on the display a message that the information recording medium 180 is in the finalized state. As shown in FIGS. 22A and 22B, the main controller 111 also displays on the display a message notifying that the additional storage is inhibited and gives off an alarm sound.

In step S403, the main controller 111 acquires the number of entries (files/directories) under the BDMV/BACKUP directory. If it is determined in step S404 that the number of entries is not zero, the recording is inhibited. To cancel the additional storage disabled state, the main controller 111 deletes the files and directories under the BDMV/BACKUP directory to set the number of entries under the BDMV/BACKUP directory to zero. The main controller 111 can thus shift the information recording medium 180 to the additional storage enabled state.

The finalize process discussed with reference to the flowchart of FIG. 9 is to inhibit the additional storage onto the information recording medium 180. The finalized state can be canceled. Through the canceling process, the additional storage can be enabled onto the information recording medium 180. The finalize canceling process may also referred to as an unfinalize process. The finalize canceling process is described below with reference to a flowchart of FIG. 24. The finalize canceling process is performed under the control of the main controller 111 when the main controller 111 detects a user's unfinalize request via the input-output interface 114 of FIG. 1.

In step S501, the main controller 111 reads the index.bdmv file recorded on the information recording medium 180 and stores the read index file onto the RAM 113. The index.bdmv file contains the index information such as the title, and has the data structure discussed with reference to the syntaxes of FIGS. 14 through 18.

The main controller 111 examines in step S502 the PlayList registered in the top menu play list "TopMenuPlayLists( )" in the play list table field "TableOfPlayLists( )" set in the index.bdmv file, and deletes the registered PlayList in step S503. This process corresponds to the determination process (a) discussed with reference to the finalized state determination process flow of FIG. 13. The PlayList for the menu set in the finalize process, namely, the top menu PlayList is deleted.

The main controller 111 examines in step S504 the PlayList registered in the first playback list "FirstPlaybackPlayLists( )" in the play list table field "TableOfPlayLists( )" set in the index.bdmv file and deletes the registered PlayList in step S505. This process corresponds to the determination process (b) discussed with reference to the finalized state determination process flow of FIG. 13. The PlayList for the menu set in the finalize process, namely, the first playback play list is deleted.

In step S506, the main controller 111 examines the data in the play list table information block "TableOfPlayLists( )" 321 (FIG. 16) contained in the data block 310 in the extension data block "blckExtensionData( )" 301 (FIG. 15) of the index.bdmv file, namely, the PlayList registered in the play list pair title information field "Title_PlayList_Pair( )" 332 in the data of FIG. 17. In step S507, the main controller 111 deletes an unregistered PlayList.

The above process corresponds to the determination process (c) discussed with reference to the finalized state determination process flow of FIG. 13. The PlayList for the menu set in the finalize process and the unregistered PlayList are thus deleted.

In step S508, the main controller 111 reads the data in the play list table information block "TableofPlayLists( )" 321 (FIG. 16) contained in the data block 310 in the extension data block "blckExtensionData( )" 301 (FIG. 15) of the index.bdmv file discussed with reference to FIG. 14, namely the final PlayList registered in the play list pair title information field "Title_PlayList_Pair( )" 332 of the data of FIG. 17.

In step S509, the main controller 111 determines the presence or absence of the photo movie identification mark of the maker private data "MakersPrivateData( )" in the final PlayList. If it is determined in step S510 that the photo movie identification mark is present, the main controller 111 deletes the final PlayList in step S511. If it is determined in step S510 that no photo movie identification mark is present, processing proceeds to step S512.

The above-described process corresponds to the determination process (d) discussed with reference to the finalized state determination process flow of FIG. 13. The PlayList for the photo movie set in the finalize process is thus deleted.

In step S512, the main controller 111 records the identifier indicating an unfinalized state in the maker private data "MakersPrivateData( )" of the index.bdmv file, or deletes the identifier indicating the finalized state.

Steps S508-S511 and step S512 are performed in an apparatus supporting the recording of the photo movie identification mark and the finalize identifier.

In step S513, the main controller 111 performs the update process to re-produce and re-record the index.bdmv file and the Movieobject.bdmv file on the information recording medium 180. In step S514, the main controller 111 ends the process by modifying the finalized state information stored on the RAM 113 into a state value indicating that the information recording medium 180 is not in the finalized state.

Through the above process, the information recording medium 180 is enabled to record additionally data. Furthermore, through the process, the menu is deleted, and the photo movie is also deleted. The state prior to the execution of the finalize process discussed with reference to FIG. 9 is set again.

Figure 24:
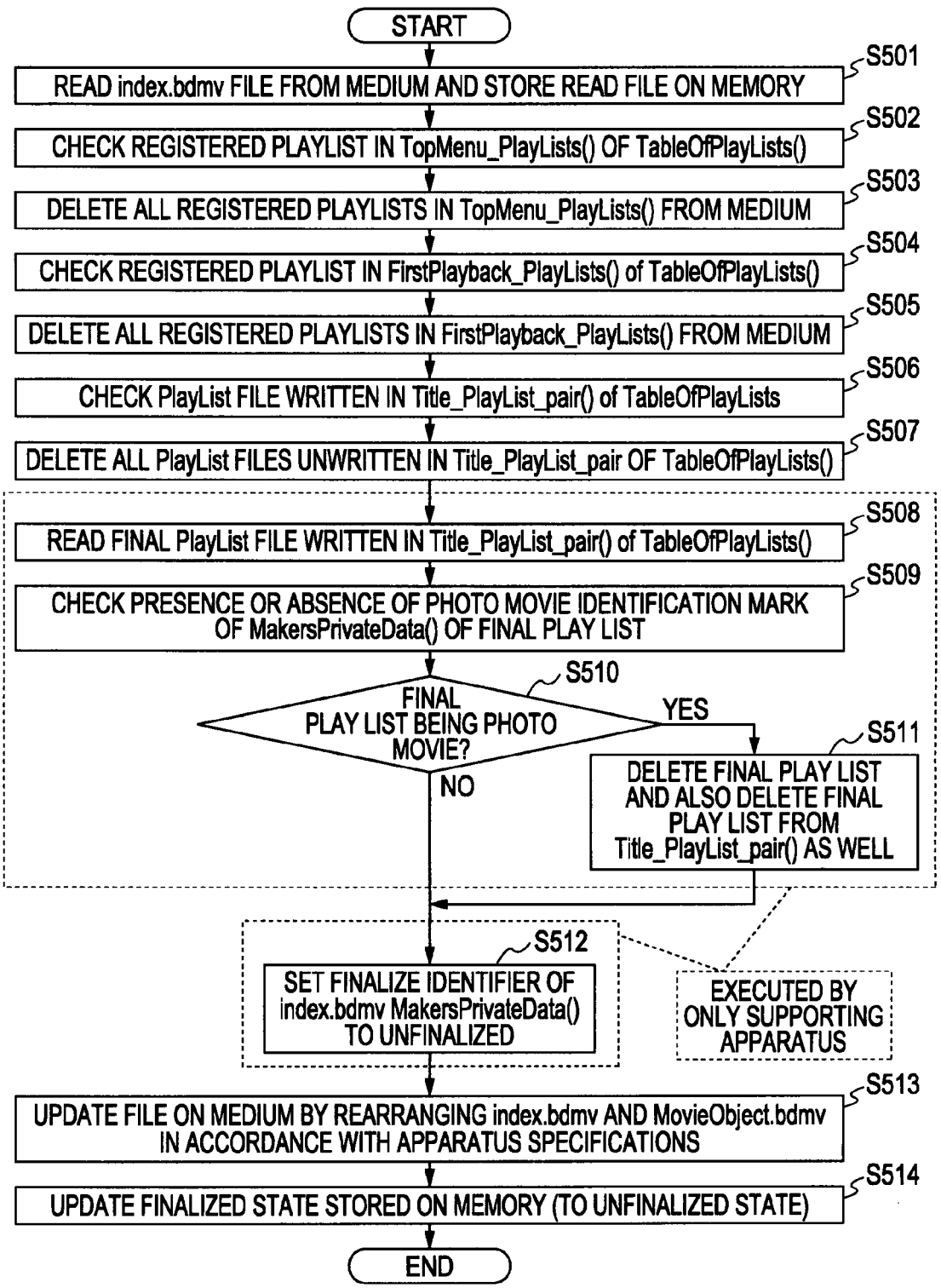
FIG. 24 is a flowchart illustrating a sequence of a finalize canceling process in accordance with one embodiment of the present invention.

In the finalize canceling process of FIG. 24, the PlayLists are deleted in steps S503, S505, S507 and S511. The detailed sequence of the play list deletion process is described below with reference to a flowchart of FIG. 25.

In step S601, the main controller 111 acquires, from the information recording medium 180, the PlayList file to be deleted, and then store the PlayList file onto the RAM 113. In step S602, the main controller 111 sets "0" onto the PlayList ID "PlayItem_id" as an initial value.

In step S603, the main controller 111 determines whether the PlayItem ID "PlayItem_id" is less than the number of play items "number_of_PlayItems" recorded in the PlayList file to be deleted. Since the initial setting of PlayItem ID "PlayItem_id" is zero, processing proceeds to step S604.

FIG. 26 illustrates a syntax of the PlayList file. As shown in FIG. 26, the PlayList file includes the type information "TypeIndicator" followed by start address information of actual data "PlayListStartAddress" and "ExtensionStartAddress", and recording fields of the actual data "blkApplicationPlayList( )" and "blkExtensionData( )". FIG. 27 illustrates a play list information block "PlayList( )" 401 of the actual data.

Information regarding the PlayItem set in the PlayList is recorded in the play list information block "PlayList( )" 401. As previously discussed with reference to FIG. 5, the PlayItem can have a sub path to a sub PlayItem as opposed to a main path to a PlayItem as a main portion to be reproduced. The play item information "blkPlayItem( )" to the main path and the sub path information "blkSubPath" to the sub path are recorded in the play list information block "PlayList( )" 401. The number of registered PlayItems in the PlayList is set in the number of play items field "NumberOfPlayItems" 411 of the play list information block of FIG. 27. In step S603 of FIG. 25, the number set in this field is examined.

In step S604, the main controller 111 acquires a clip information file name "Clip_Information?file_name [0]" corresponding to the play item ID "PlayItem_id"=initial value zero. The main controller 111 acquires the clip information file name "Clip_Information_file_name [0]" recorded in a play item block "blkPlayItem( )" 412 of the play list information block of FIG. 27.

FIG. 28 illustrates a syntax of the play item block "blkPlayItem( )" 412 of the play list information block of FIG. 27. Clip information for the PlayList contained in the PlayList is recorded in the play item block "blkPlayItem( )" 412. For example, a file name of the clip information for the PlayList is recorded in a clip information file name "ClipInformationFileName" 421. In step S604 of FIG. 25, the main controller 111 acquires the clip information file name "Clip_Information_file_name [0]." In step S605, the main controller 111 attaches an extension ".clpi" to the acquired clip information file name, and searches for and deletes a corresponding file from the directory discussed with reference to FIG. 6. As a result, the clip information file for one PlayItem in the PlayList is deleted. In steps of S606 and S607, the main controller 111 searches for and deletes the clip information recorded as the backup information in the BACKUP directory in the directory structure discussed with reference to FIG. 6. In step S608, the main controller 111 increments the play item ID "PlayItem_id" by one, and then repeat step S603 and subsequent steps.

When the main controller 111 deletes the clip information for the PlayItem in the PlayList to be deleted by repeating steps S603-S608, the answer to the determination in step S603 is negative. Processing proceeds to step S609. Steps S609-S615 form the deletion process of the clip information file for the sub PlayItem. As previously discussed with reference to FIG. 5, the PlayItem can have a sub path to a sub PlayItem as opposed to a main path to a PlayItem as a main portion to be reproduced. The play item information "blkPlayItem( )" to the main path and the sub path information "blkSubPath" to the sub path are recorded as the play list information as discussed with reference to FIG. 27. Through steps S609-S615, the clip information for the sub play item information is acquired from the PlayList file in accordance with the play list information and then deleted.

In step S609, "0" is set to a sub path ID "SubPath_id" as an initial value. In step S610, the main controller 111 determines whether the sub path ID "SubPath_id" is less than the number of sub paths "number_of_Subpaths" recorded in the PlayList file to be deleted. Since the initial setting of the sub path ID "SubPath_id" is zero, processing proceeds to step S611.

In step S611, the main controller 111 acquires a clip information file name "Clip_Information_file_name [0]" in the sub PlayItem "SubPlayItem( )" for the sub path ID "SubPath_id" having the initial value of zero. The main controller 111 acquires the clip information file name "Clip_Information_file_name [0]" recorded in the play item block "blkPlayItem( )" 412 of FIG. 27.

FIG. 29 illustrates a syntax of a sub path block "blkSubPath( )" 413 of the play list information block of FIG. 27. In the sub path, the set value of a number of play items field "NumberOfPlayItems" 431 of FIG. 29 is fixed to "1." More specifically, one PlayItem is set for one sub path. Information of the PlayItem is recorded in a sub play item field "SubPlayItem(i)" 432. FIG. 30 illustrates the data structure of the sub play item field "SubPlayItem(i)" 432. The clip information for the sub PlayItem contained in the PlayList is recorded in the sub play item block. For example, a file name of the clip information for the sub path is recorded in a clip information file name "ClipInformationFileName" 441.

Figure 25:
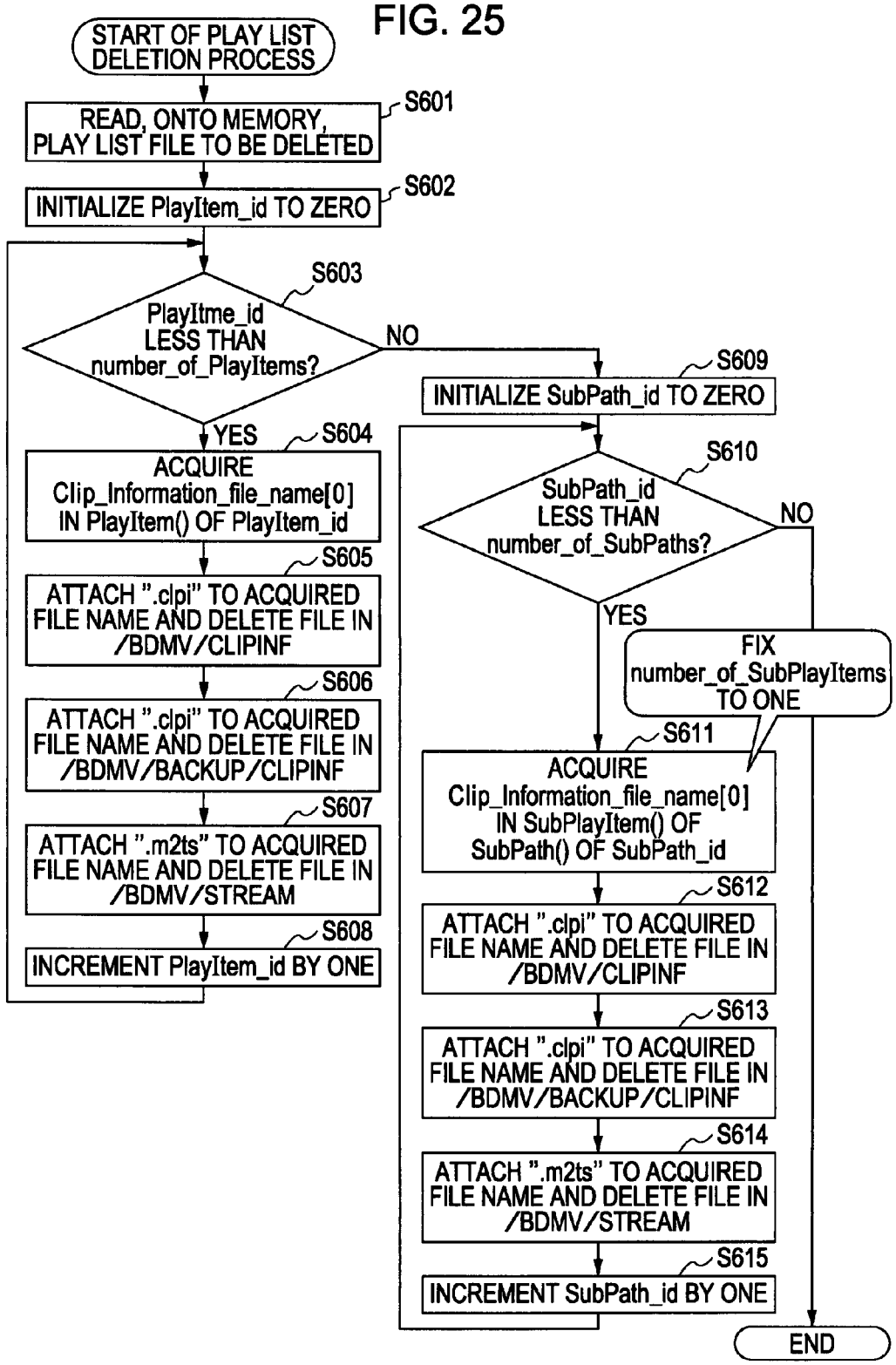
FIG. 25 is a flowchart illustrating a sequence of a play list deletion process in accordance with one embodiment of the present invention.

In step S611 of FIG. 25, the clip information file name "Clip_Information_file_name [0] is acquired. In step S612, an extension is attached to the acquired clip information file name. The main controller 111 searches for and deletes the correspond file in the director discussed with reference to FIG. 6. Through this process, the clip information file for one sub path in the PlayList is deleted. Through steps S613 and S614, the main controller 111 searches for and deletes the clip information recorded as the backup information in the BACKUP directory in the directory discussed with reference to FIG. 6. After this process, the main controller 111 increments the sub path ID "SubPath_id" by one as a set value, and repeats step S610 and subsequent steps.

When the main controller 111 deletes all the clip information for the sub path in the PlayList to be deleted by repeating steps S610-S615, the answer to the determination in step S610 becomes negative. Processing thus ends. Through the above processes, the PlayList is deleted. The above processes are performed in steps S503, S505, S507 and S511 in the finalize canceling process discussed with reference to FIG. 24. The PlayList produced in the finalize process for the menu and the photo movie is thus deleted. The main controller 111 restores the information recording medium 180 to the state prior to the execution of the finalize process. The information recording medium 180 is now ready to store additionally data. In this condition, no menu is present. Even when new content is recorded, no discrepancy with any menu takes place. Since the photo movie is also deleted, a photo movie containing a newly recorded still image is produced by recording the new still image and performing the finalize process.

The present invention has been discussed with reference to specific embodiments. However, it will be apparent to those skilled in the art that changes and modifications are made to the present invention without departing from the scope of the present invention. The embodiments of the present invention have been discussed for exemplary purposes only, and are not intended to limit the scope of the present invention. The scope of the present invention is to be limited by the appended claims only.

The above-referenced series of process steps may be performed using hardware, software or a combination thereof. If the process steps are performed using software, a program of the software may be installed from a recording medium onto a computer built in dedicated hardware or a general-purpose personal computer enabled to perform a variety of functions with a variety of programs installed thereon.

The program may be pre-stored on a hard disk or a ROM. The program may also be stored (recorded) temporarily or permanently on a removable recording medium such as a flexible disk, a compact disk read-only memory (CD-ROM), a magneto-optical (MO) disk, a digital versatile disk (DVD), a magnetic disk, or a semiconductor memory. Such a removable disk may be supplied as package software.

The program may be installed on the computer from the above-mentioned removable recording medium. Alternatively, the program may be transmitted from a download side to the computer fashion in a wireless or a wired fashion using a network such as the Internet. The computer receives such a transmitted program, and installs the program onto a recording medium such as a built-in hard disk.

The process steps describing the program may be performed in the time-series order sequence as previously stated. Alternatively, the process steps may be performed in parallel or separately. In the context of this specification, the system refers to a logical set of a plurality of apparatuses and is not necessarily a single apparatus in a single casing.

What is claimed is:

1. An information processing apparatus, comprising:
a controller for controlling data recording to an information recording medium, the controller executing a state determination process of determining whether the information recording medium is ready to record additionally data based on whether at least one playlist is registered in a top menu play list in a play list table field of an index file recorded on the information recording medium and is to be shown when the information recording medium is accessible.

2. The information processing apparatus according to claim 1, wherein the controller executes a further state determination process of determining whether the information recording medium is ready to record additionally data based on whether at least one further playlist is registered in a first play back play list in a play list table field of an index file recorded on the information recording medium.

3. The information processing apparatus according to claim 1, wherein the controller in the state determination process examines data stored on the information recording medium and determines that the information recording medium is not ready to store additionally the data if information indicating that play list information corresponding to moving image format data generated based on a still image is recorded on the information recording medium is detected.

4. The information processing apparatus according to claim 1, wherein the controller in the state determination process examines data stored on the information recording medium and determines that the information recording medium is not ready to store additionally the data if identification information indicating that a transition process of the information recording medium to a data additional storage disabled state has been performed is detected.

5. The information processing apparatus according to claim 1, wherein the controller performs a transition process on the information recording medium from the data additional storage disabled state to a data additional storage enabled state in response to an input of a transition request requesting transition to the data additional storage enabled state.

6. The information processing apparatus according to claim 5, wherein the controller in the transition process of the information recording medium to the data additional storage enabled state examines the data stored on the information recording medium and deletes play list information corresponding to a menu.

7. The information processing apparatus according to claim 5, wherein the controller in the transition process of the information recording medium to the data additional storage enabled state examines the data stored on the information recording medium and deletes play list information corresponding to moving image format data generated based on a still image.

8. The information processing apparatus according to claim 5, wherein the controller in the transition process of the information recording medium to the data additional storage enabled state examines the data stored on the information recording medium and deletes identification information indicating that the transition process of the information recording medium to the data additional storage disabled state has been performed or records information indicating that the information recording medium is ready to store additionally the data.

9. The information processing apparatus according to claim 1, wherein the controller in the state determination process examines the number of entries set in a backup data storage directory in data stored on the information recording medium and determines that the information recording medium is not ready to store additionally the data if at least one set entry is detected.

10. The information processing apparatus according to claim 9, wherein the controller in the state determination process sets the information recording medium to a data additional storage enabled state by deleting the entry set in the backup data storage directory if at least one entry set in the backup data storage directory is detected in the data stored on the information recording medium.

11. An information processing method of an information processing apparatus for recording data on an information recording medium, the method comprising:
    executing a state determination process of determining whether the information recording medium is ready to record additionally data based on whether at least one playlist is registered in a top menu play list in a play list table field of an index file recorded on information recording medium and is to be shown when the information recording medium is accessible.

12. The information processing method according to claim 11, further comprising executing a further state determination process of determining whether the information recording medium is ready to record additionally data based on whether at least one further playlist is registered in a first play back play list in a play list table field of an index file recorded on the information recording medium.

13. The information processing method according to claim 11, further comprising examining data stored on the information recording medium and determining that the information recording medium is not ready to store additionally the data if information indicating that play list information corresponding to moving image format data generated based on a still image is recorded on the information recording medium is detected.

14. The information processing method according to claim 11, further comprising examining data stored on the information recording medium and determining that the information recording medium is not ready to store additionally the data if identification information indicating that a transition process of the information recording medium to a data additional storage disabled state has been performed is detected.

15. The information processing method according to claim 11, further comprising performing a transition process on the information recording medium from the data additional storage disabled state to a data additional storage enabled state in response to an input of a transition request requesting transition to the data additional storage enabled state.

16. The information processing method according to claim 15, further comprising examining the data stored on the information recording medium and deleting play list information corresponding to a menu.

17. The information processing method according to claim 15, further comprising examining the data stored on the information recording medium and deleting play list information corresponding to moving image format data generated based on a still image.

18. The information processing method according to claim 15, further comprising examining the data stored on the information recording medium and deleting identification information indicating that the transition process of the information recording medium to the data additional storage disabled state has been performed or recording information indicating that the information recording medium is ready to store additionally the data.

19. The information processing method according to claim 11, further comprising examining the number of entries set in a backup data storage directory in data stored on the information recording medium and determining that the information recording medium is not ready to store additionally the data if at least one set entry is detected.

20. The information processing method according to claim 19, further comprising setting the information recording medium to a data additional storage enabled state by deleting the entry set in the backup data storage directory if at least one entry set in the backup data storage directory is detected in the data stored on the information recording medium.

21. A processor encoded with a computer program for carrying out a method of recording data on an information recording medium, the method comprising:
    executing a state determination process of determining whether the information recording medium is ready to record additionally data based on whether at least one playlist is registered in a top menu play list in a play list table field of an index file recorded on information recording medium and is to be shown when the information recording medium is accessible.

* * * * *